United States Patent
Bouhnik et al.

(10) Patent No.: US 8,405,038 B2
(45) Date of Patent: Mar. 26, 2013

(54) SYSTEMS AND METHODS FOR PROVIDING A SHARED CHARGE IN PIXELATED IMAGE DETECTORS

(75) Inventors: Jean-Paul Bouhnik, Zichron Yaacov (IL); James William Hugg, Glenville, NY (US); Ira Blevis, Zichron Yaakov (IL); Yaron Hefetz, Kibbutz Alonim (IL)

(73) Assignee: General Electric Company, Schenectady, NY (US)

( * ) Notice: Subject to any disclaimer, the term of this patent is extended or adjusted under 35 U.S.C. 154(b) by 163 days.

(21) Appl. No.: 12/649,987

(22) Filed: Dec. 30, 2009

(65) Prior Publication Data

US 2011/0155918 A1 Jun. 30, 2011

(51) Int. Cl.
*G01T 1/24* (2006.01)
(52) U.S. Cl. .................................. 250/370.14
(58) Field of Classification Search ............. 250/363.04, 250/370.09, 370.1, 370.14, 394
See application file for complete search history.

(56) References Cited

U.S. PATENT DOCUMENTS

| | | | |
|---|---|---|---|
| 5,504,334 A | 4/1996 | Jansen et al. | |
| 5,754,690 A | 5/1998 | Jackson et al. | |
| 5,825,033 A * | 10/1998 | Barrett et al. | 250/370.1 |
| 5,847,398 A * | 12/1998 | Shahar et al. | 250/370.09 |
| 6,002,741 A | 12/1999 | Eisen et al. | |
| 6,169,287 B1 | 1/2001 | Warburton | |
| 6,618,185 B2 | 9/2003 | Sandström | |
| 7,495,228 B1 | 2/2009 | Albagli et al. | |
| 7,508,509 B2 | 3/2009 | Lehtikoski et al. | |
| 7,692,156 B1 | 4/2010 | Nagarkar | |
| 2003/0099026 A1 | 5/2003 | Sandström | |
| 2003/0128324 A1 | 7/2003 | Woods et al. | |
| 2004/0195512 A1* | 10/2004 | Crosetto | 250/363.04 |
| 2005/0139777 A1 | 6/2005 | Rostaing et al. | |
| 2006/0086913 A1 | 4/2006 | Spahn | |
| 2009/0110144 A1 | 4/2009 | Takahashi et al. | |

OTHER PUBLICATIONS

PCT Search Report and Written Opinion from PCT Application No. PCT/US2010/055353 on Nov. 10, 2011.
PCT Invitation to Pay Additional Fees from PCT Application No. PCT/US2010/055353 on Sep. 16, 2011.
HH Barrett, JD Eskin, HB Barber, "Charge transport in arrays of semiconductor gamma-ray detectors," Physical Review Letters 75:156-159 (1995).
JD Eskin, HH Barrett, HB Barber, "Signals induced in semiconductor gamma-ray imaging detectors," Journal of Applied Physics 85:647-659 (1999).
A Niemela, H Sipila, VI Ivanov, "High-resolution p-i-n CdTe and CdZnTe X-ray detector with cooling and rise-time discrimination," IEEE Trans on Nucl Sci 43: 1476-1480 (1996).

* cited by examiner

*Primary Examiner* — Marcus Taningco
(74) *Attorney, Agent, or Firm* — The Small Patent Law Group; Dean D. Small

(57) ABSTRACT

Systems and methods for providing a shared charge in pixelated image detectors are provided. One method includes providing a plurality of pixels for a pixelated solid state photon detector in a configuration such that a charge distribution is detected by at least two pixels and obtaining charge information from the at least two pixels. The method further includes determining a position of an interaction of the charge distribution with the plurality of pixels based on the obtained charge information.

15 Claims, 16 Drawing Sheets

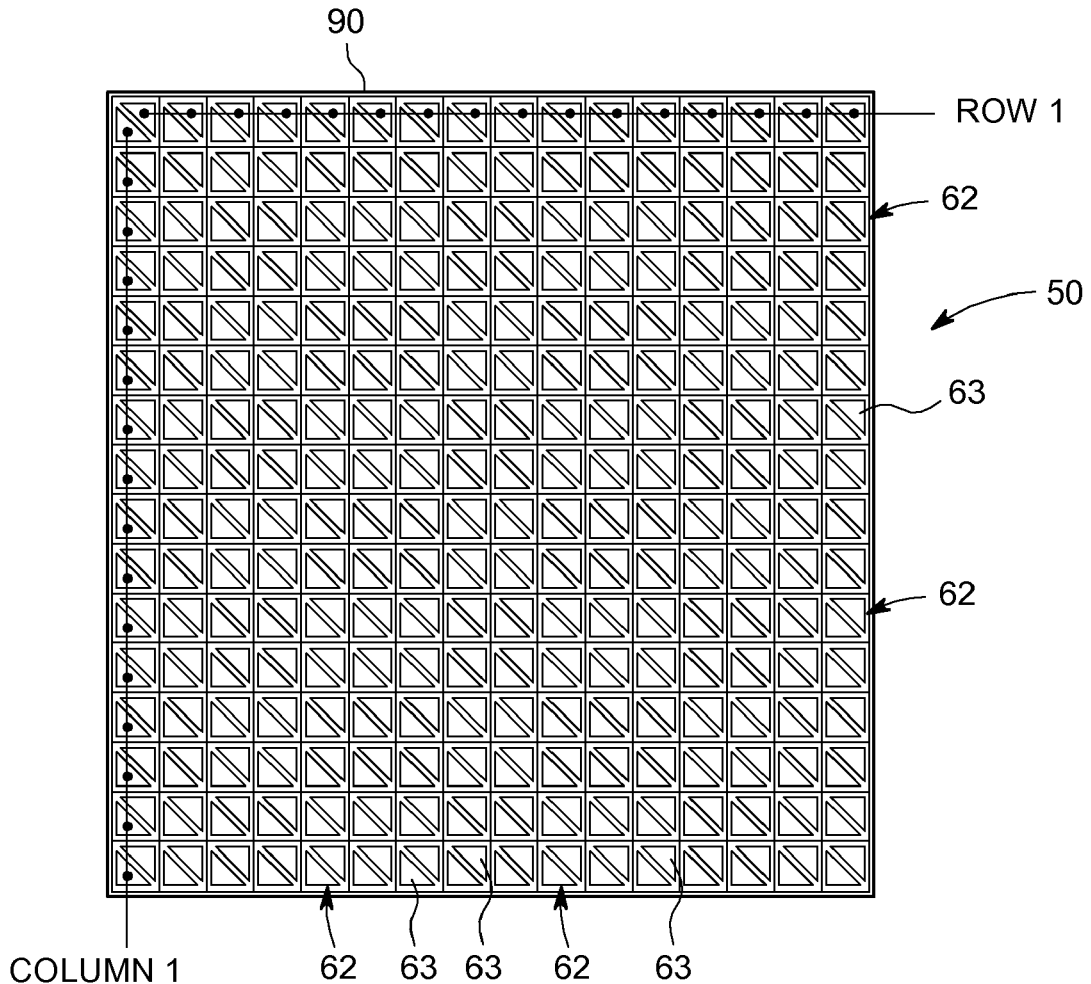
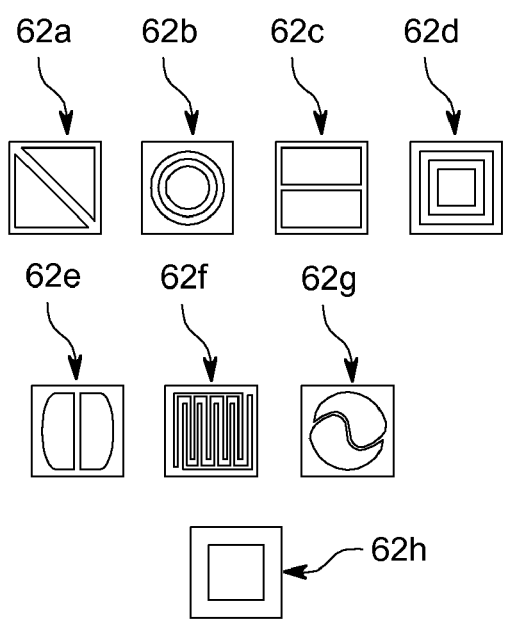
FIG. 5

SYSTEMS AND METHODS FOR PROVIDING A SHARED CHARGE IN PIXELATED IMAGE DETECTORS

BACKGROUND OF THE INVENTION

The subject matter disclosed herein relates generally to image detectors, and more particularly to pixelated solid state image detectors and photon detection with the detectors.

Detectors for diagnostic imaging systems, for example, detectors for single photon emission computed tomography (SPECT) and computed tomography (CT) imaging systems are often produced from semiconductor materials, such as Cadmium Zinc Telluride (CdZnTe), often referred to as CZT, Cadmium Telluride (CdTe) and Silicon (Si), among others. These semiconductor detectors typically include arrays of pixelated detector modules. The spatial resolution of pixelated solid state gamma ray detectors is limited by the size of the detector pixels. The minimal pixel size is also limited by the solid state physics and engineering.

During the interaction of gamma ray in a CZT detector, a charge cloud is developed between the continuous cathode and the pixelated anode. This cloud grows moving toward the anode side of the detectors. In conventional systems, each pixel anode is connected to a preamplifier and a large number of readout channels per pixel (e.g., 256 readout channels). Thus, as pixel size decreases to improve spatial resolution, the number of total readout channels increases, thereby increasing the complexity of the electronics, controllers, cost and heat production. Accordingly, gamma and x-ray detectors using direct conversion semiconductor materials such as CZT or CdTe are manufactured with relatively large pixel sizes to reduce complexity of the electronics (e.g., reduce application specific integrated circuit (ASIC) complexity) and reduce or avoid charge cloud sharing between adjacent pixels.

However, this large pixel size does not perform satisfactorily for x-ray and CT applications. Additionally, in SPECT systems, image performance is directly related to the number of detector pixels.

BRIEF DESCRIPTION OF THE INVENTION

In accordance with various embodiments, a method for controlling a charge distribution of a pixelated solid state photon detector is provided. The method includes providing a plurality of pixels for a pixelated solid state photon detector in a configuration such that a charge distribution is detected by at least two pixels and obtaining charge information from the at least two pixels. The method further includes determining a position of an interaction of the charge distribution with the plurality of pixels based on the obtained charge information.

In accordance with other embodiments, a pixelated solid state photon detector is provided that includes a semiconductor substrate and a plurality of anode pixels on one surface of the semiconductor substrate. Each of the anode pixels has a stretched length in at least one direction. The pixelated solid state photon detector further includes a cathode on another surface of the semiconductor substrate opposite from the plurality of anode pixels.

In accordance with yet other embodiments, a pixelated solid state photon detector is provided that includes a semiconductor substrate and a plurality of anode pixels on one surface of the semiconductor substrate. Each of the anode pixels is divided into a plurality of sub-pixels. The pixelated solid state photon detector further includes a cathode on another surface of the semiconductor substrate opposite from the plurality of anode pixels.

BRIEF DESCRIPTION OF THE DRAWINGS

FIG. 5 is a top plan view of pixelated detector formed in accordance with various embodiments and illustrating different pixel configurations.

DETAILED DESCRIPTION OF THE INVENTION

Figure 1:
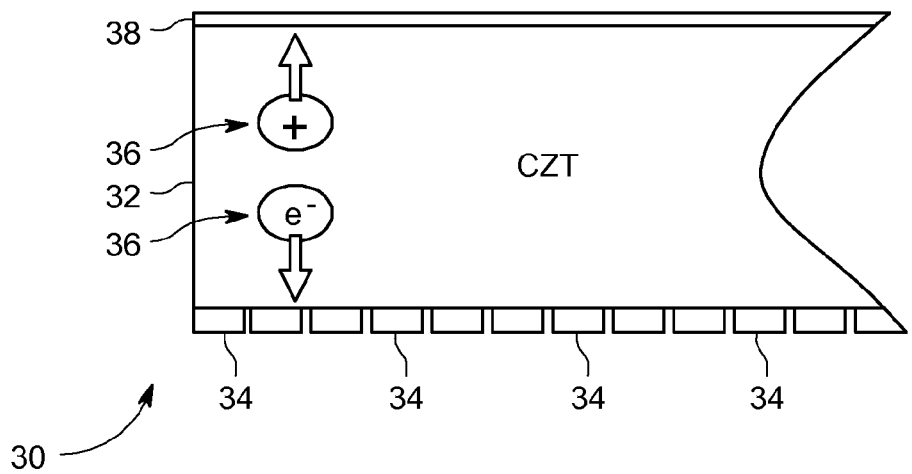
FIG. 1 is a simplified cross-sectional view of a portion of a pixelated detector formed in accordance with various embodiments.

The foregoing summary, as well as the following detailed description of certain embodiments will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or random access memory, hard disk, or the like) or multiple pieces of hardware. Similarly, the programs may be stand alone programs, may be incorporated as subroutines in an operating system, may be functions in an installed software package, and the like. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Also as used herein, the phrase "reconstructing an image" is not intended to exclude embodiments in which data representing an image is generated, but a viewable image is not. Therefore, as used herein the term "image" broadly refers to both viewable images and data representing a viewable image. However, many embodiments generate, or are configured to generate, at least one viewable image.

Various embodiments provide systems and methods for controlling charge distribution in pixelated solid-state (e.g., semiconductor) detectors to allow detection of charge sharing and identification of the position of the charge sharing interaction with the pixelated detectors. The pixels of the pixelated detector are configured such that a charge distribution, which may be defined by an electron charge cloud, is detected by at least two pixels or sub-pixels. Different configurations and arrangements of pixelated detectors, for example, pixelated gamma cameras having different shaped and positioned pixel or sub-pixel elements are provided. Pixelated detectors formed in accordance with various embodiments provide higher spatial resolution without having a large increase in the associated electronics. A technical effect of at least one of the various embodiments is providing more sensitive imaging, such as more sensitive single photon emission computed tomography (SPECT) and/or x-ray or computed tomography (CT) imaging scanners. Additionally, operation at lower power consumption levels may be provided when practicing the various embodiments. The various embodiments also allow the pixelated detectors to be provided for dual uses including as an x-ray and gamma ray detector.

It should be noted that although the various embodiments are described in connection with nuclear medicine imaging systems having particular components, including specific configurations or arrangements of pixelated detectors, the various embodiments are not limited to nuclear medicine imaging systems or to the specific pixelated detectors described herein. Accordingly, the various embodiments may be implemented in connection with any type of diagnostic imaging system, for example, medical diagnostic imaging system (e.g., CT or x-ray system), non-destructive testing system, security monitoring system (e.g., air baggage or airport security imaging system), etc. Additionally, the configurations and arrangements may be modified such that in at least some of the various embodiments a relationship is maintained between the location of a charge distribution and respective signals received from anodes of the pixelated detectors.

The various embodiments provide pixelated detectors that detect photons, such as emission gamma ray photons or transmission x-ray photons and use configurations and arrangements to identify the location of the detected photon from charge sharing between pixels or sub-pixels of the pixelated detector. Accordingly, because the charge distribution shared among adjacent pixels is detected, the charge that created the interaction among the adjacent pixels can be included, for example, in the response function for a detected gamma ray emission as described in more detail herein.

FIG. 1 is a simplified cross-sectional elevation view of a pixelated detector 30 formed in accordance with various embodiments. The pixelated detector 30 includes a substrate 32 formed from a radiation responsive semiconductor material, for example, cadmium zinc telluride (CZT) crystals or cadmium telluride (CdTe). A pixelated structure having a plurality of pixels or sub-pixels (as described in more detail herein) is defined by depositing a plurality of conductive electrodes to form a plurality of pixel electrodes, identified as anodes 34. Deposition may be performed through a mask to define the electrode structure. Alternatively, a continuous conductive layer (e.g., metal layer) is deposited on the surface of the crystal and a plurality of electrically separated electrodes are formed by chemical or laser etching, photolithography or other methods known in the art. As described in more detail herein, a shape and configuration of the anodes 34, as well as a spacing between each of the anodes 34 facilitates determining a location of a charge sharing interaction 36 from a charge generated from a detected photon. As described in more detail herein, the charge interaction 36 results when a photon incident on the substrate 32 losses energy by ionization and leaves pairs of mobile electrons (e−) and holes (+) in regions of the substrate 32 (only one pair of electrons/holes are illustrated for simplicity).

The pixelated detector 30 also includes a cathode 38 on an opposite surface or side of the substrate 32 from the anodes 34 and which may be formed from a single cathode electrode. It should be noted that the anodes 34 may define pixels or may be divided such that sub-pixels are formed. It also should be noted that one or more collimators may be provided in front of a radiation detecting surface defined by the cathode 38. It further should be noted that laser etching and photolithography, as well as other micro-machining and nanotechnology methods can create structures with fine details to sub-micrometer and several nanometer scales for use in accordance with various embodiments.

Figure 2:
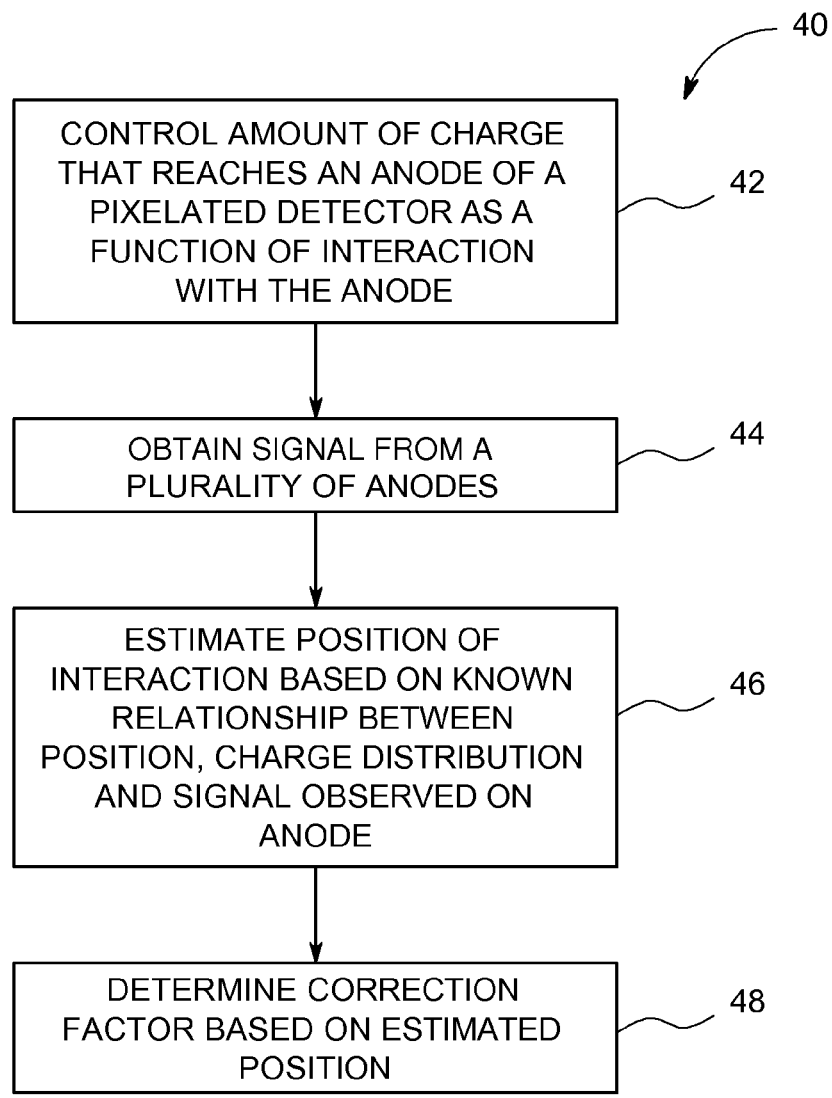
FIG. 2 is a flowchart of a method for controlling a charge distribution among a plurality of pixelated elements of a pixelated detector in accordance with various embodiments.

FIG. 2 is flowchart of a method 40 for controlling a charge distribution (also referred to as a charge cloud) among a plurality of pixelated elements, and in particular pixel anodes, of a pixelated detector. Specifically, at 42 an amount of charge that reaches an anode of a pixelated detector is controlled as a function of the interaction with the anode. As described in more detail herein, the charge sharing is controlled by defining different configurations and arrangements of pixelated elements, for example, by shaping and spacing the pixelated elements, as well as connecting the pixelated elements to define a relationship between the location of a detected charge and the anode signals. For example, by controlling the amount of charge that reached an anode, for example, by shaping the anodes as described in more detail herein, localization and detection of a radiation interaction event, namely a charge sharing event is provided.

In operation, photons, for example emission gamma rays and/or transmission x-rays, from a source, such as a radionuclide decaying in a patient or an x-ray tube, respectively, impinge on the cathode of the detector. In particular, as shown in FIG. 1, the cathode 38 may be a single cathode electrode and the anodes 34 may be an array of shaped pixel electrodes. A voltage difference applied between the anodes 34 and the cathode 38 during operation generates an electric field (detector field) in the substrate 32. The detector field may be, for example, about one kilovolts per centimeter to three kilovolts per centimeter. When a photon is incident on substrate 32 (impinges on the cathode 38), the photon generally loses all of the energy of the photon in the substrate 32 by ionization and leaves pairs of mobile electrons and holes in a small localized region of substrate 32.

Depending on the photon energy, the photon generally penetrates into the crystal before interacting with the crystal. It should be noted that the higher the energy, the larger the probability that the photon penetrates deeper into the crystal. The initial ionization event creates fast moving electrons (e−) and leaves positively ionized "holes" in the crystal. The fast moving electrons soon interact with other electrons and ionize more of the crystal. Consequently, the number or electrons (equal to the number of holes) generated, and the size of the ionization zone increases with photon energy. As a result of the detector field, holes (+) drift toward the cathode 38 and electrons (e−) drift toward the anodes 34, thereby inducing charges on the anodes 34 and the cathode 38. During the drift, the electrons (and holes) disperse due to an initial residual velocity, the random thermal motion, mutual electrostatic repulsion, and collisions with impurities in the crystal. The induced charges on anodes 34 are detected and the time at which a photon was detected, how much energy the detected photon deposited in the substrate 32 and where in the substrate 32 the photon interaction occurred are also determined as described in more detail herein. In particular, to facilitate detection of gamma and x-ray photons and identification of the detected pixel location (and other charge information), the amount of charge that reaches an anode is controlled by shaping the anodes as described in more detail herein.

Referring again to the method 40 of FIG. 2, the charge generated from the detected photons as described above creates signals that are obtained from the plurality of anodes at 44. The signals correspond to the one or more anodes (or sub-pixelated anodes) that detected the energy, such as the energy shared by two adjacent anodes. Using this signal information, a position of the interaction is estimated at 46. The position estimate is determined from a known relationship between position, charge distribution and signal observed at the anodes having the amount of charge controlled thereto. For example, an estimate of the charge location may be based on an estimate from two anodes sharing the detected charge as described in more detail herein. Additionally, using the determined estimates, such as from two anodes, a correction factor may be determined at 48 using the estimated position of the charge distribution.

Figure 3:
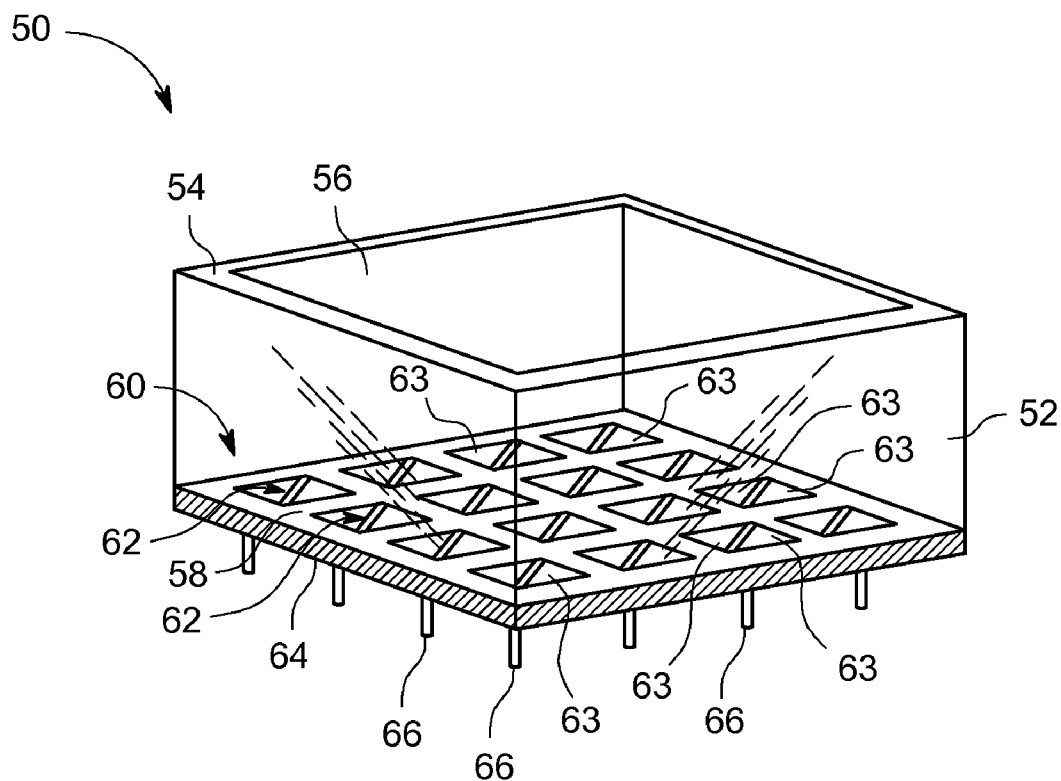
FIG. 3 is a top perspective view of a pixelated photon detector formed in accordance with one embodiment.

The method 40 may be used in connection with a pixelated detector as illustrated in FIG. 1, or for example, a sub-pixelated detector 50 as shown in FIG. 3, which may be configured as a sub-pixelated semiconductor photon detector, which in various embodiments is formed from CZT. It should be noted that although the sub-pixel elements are shown as sized and shaped in a particular manner (illustrated as a divided square electrodes in FIG. 3), the size, shape and connection of the electrodes may be modified as desired or needed. Moreover, as described in more detail below, the pixels may be sized and shaped differently, for example, a saw-toothed shaped or zig-zaged shaped array of the pixelated electrodes may be provided.

It should be noted that the pixelated detectors 50 in various embodiments are formed from CZT or CdTe. The pixelated detectors 50 include a crystal 52 formed from the semiconductor material. A face 54 of the crystal 52 in some embodiments (as illustrated) includes a single cathode electrode 56. An opposite face 58 of the crystal 52 includes an anode 60 having an array of anode pixels 62. The anode pixels 62 may be of substantially the same size and are illustrated as divided squares, namely triangular shaped sub-pixels 63 that form square shaped pixels 62. The size of the anode pixels 62 and sub-pixels 62 can vary for example, between 0.01 millimeters $(mm)^2$ and 4 $mm^2$. For example, in some embodiments, the pixels 62 have a size of about 0.1×0.1 mm or less. Also, the number of anode pixels 62 may be greater or less than the sixteen shown, for example, thirty-two anode pixels 62 may be provided. It also should be noted that the thickness of the crystal 52 may vary between less then one millimeter to several centimeters. In some embodiments, a thickness of several millimeters is used so as to substantially absorb at least a large portion of the impinging photons. Thus, the thickness depends on the energy of the photon to be detected.

In operation, and as described in more detail herein, a voltage difference applied between the cathode electrode 56 and the anode 60 generates an electric field in the crystal 52. In pixelated detectors used in the art, electrons belonging to the same events substantially arrive at one anode. In many such detectors, if electrons generated by events are spread over two or more electrodes, the events are rejected or incorrectly registered. Thus, a limit is placed on the resolution of such detectors as pixel size must be much larger than the spread of electrons, otherwise event loss due to partially collected charge will occur. In these detectors, spatial resolution is determined by the anode size, as the location of the event is determined by the electrode that received all or the majority of the charge generated by that event.

By practicing various embodiments of the invention, charge sharing among at least two, and optionally more electrodes is provided, and the event location is determined by an algorithm based on the charge detected by the plurality of electrodes as described herein. In some embodiments, the size of the electrodes is substantially smaller than the spread of the electrons. In other embodiments, the electrodes are shaped so that that charge is shared by neighboring electrodes. In other embodiments, the effective resolution is better than the electron spread, the electrode size or both.

In operation, when a photon having energy typical of the energies of photons used in SPECT, x-ray, CT or PET applications is incident on the crystal 52, the photon generally interacts with the crystal 52 and pairs of mobile electrons and holes in a small localized region of the crystal 52 are generated through a secondary ionization process. As a result of the applied electrical field, the holes drift to cathode 56 and the electrons drift to anode 60, thereby inducing charges (also referred to as charge clouds or electron clouds) on the anode pixels 62 and the cathode 56 as described in more detail herein. The induced charges on anode pixels 62 are sensed and may be partially preprocessed by appropriate electronic circuits (e.g., application specific integrated circuits (ASICs)) within a detector base 64 and on which the pixelated detector 50 is mounted. For example, a plurality of channels forming a readout amplifier chain may be provided. The detector base 64 includes connection members, for example, connection pins 66 for mounting to a motherboard (not shown) and transmitting signals from the ASICs to the motherboard. Signals from the induced charges on anode pixels 62 are used to determine charge information, including any or all of the time at which a photon is detected, how much energy the detected photon deposited in the crystal and where in the crystal the photon interaction took place as described in more detail herein (e.g., using a row/column summing method). This information may then be used to reconstruct an image as known in the art.

Figure 4:
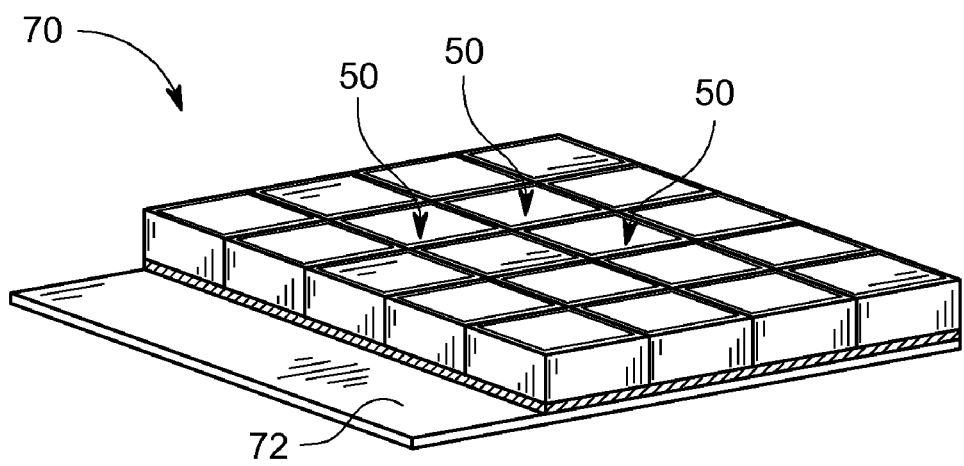
FIG. 4 is a top perspective view of a gamma camera including a plurality of pixelated photon detectors of FIG. 3.

FIG. 4 illustrates a rectangular gamma camera 70 that includes a plurality, for example, twenty pixelated detectors 50 arranged to form a rectangular array of five rows of four detectors 50. The pixelated detectors 50 are shown mounted on a motherboard 72. It should be noted that gamma cameras having larger or smaller arrays of pixelated detectors 50 may be provided. It should also be noted that the energy of a photon detected by a pixelated detector 50 is generally determined from an estimate of the total number of electron-hole pairs produced in the crystal 52 of the detector 50 when the photon interacts with the material of the crystal 52. This count is generally determined from the number of electrons produced in the ionizing event, which is estimated from the charge collected on the anode 60 of the detector 50 using the various embodiments.

If all the electrons and holes produced by a photon detected in the detector 50 are properly collected by the detector electrodes, then the induced charge on either the anode 60 or the cathode 56 of the detector 50 is a correct measure of the energy of the photon. However, the energy response for each pixel, and in particular, the peak position for each peak may shift in the energy spectrum and affect the acquired data used to reconstruct an image. Using the various embodiments, the shifting may be minimized or corrected using a known relationship between the location of the pixels and the anode signals as controlled, for example, by the shaping and connection of the pixels as described in more detail below.

For a detector used in the art of nuclear medicine (NM) detection, the detector may have a crystal of 40×40×4 mm and a large that face comprises 16×16=256 anodes of 2.5×2.5 mm. The spatial resolution is, thus, 2.5 mm. Each anode is connected to one of 256 electronic channels. Noise in this configuration limits the energy resolution given by the main components: dark current through 2.5×2.5=6.25 mm$^2$ of crystal, statistical fluctuation of the electron-hole generation and electronic noise of a single channel. If, for example the spread of the electron cloud is 0.1 mm, the probability of event to be confined to one and only one electrode is: $[(2.5-0.1)^2]/[(2.5)^2]=0.92$. Thus, about 8 percent of the events are at least partially shared among two or more electrodes (up to four when the event strikes at or near the corner of a pixel).

To increase the resolution to 0.5 mm, an array of 80×80=6,400 anodes may be used, each 0.5×0.5 mm. In this case, the probability for unshared event is $(0.4/0.5)^2=0.64$. Thus, efficiency of detection is greatly reduced. Additionally, 6,400 channels must be used. The noise is given by (assuming two nearby pixels are used): dark current through 2*0.5×0.5=0.5 mm$^2$ of crystal, statistical fluctuation of the electron-hole generation and twice the electronic noise of a single channel. However, even a modest resolution of 0.5 mm (which is not enough for mammography where 0.1 mm resolution may be needed) requires 6,400 channels, which may be difficult to connect, package, cool and have a high cost.

By practice of one or more of the various embodiments, a detector having reduced number of channels includes a plurality of anode pixels 62 that may be divided into two sub-pixels 63, namely two electrodes. Referring to FIG. 5, for a 40×40 mm detector, each 2.5×2.5 mm pixel is divided into two electrodes: row electrodes (upper right sub-pixels 63 of each pixel 62) and a column electrode (lower right sub-pixels 63 of each pixel 62). In various embodiments, the electrodes are patterned such that electrons must be shared by both row electrode and column electrode regardless of the position of the events.

The shape of the sub-pixels 63 may be changed as desired or needed. For example, in addition to an anode pixel 62a having triangular shaped sub-pixels the following shapes may be provided: an anode pixel 62b with concentric circle shaped sub-pixels, an anode pixel 62c with rectangular shaped sub-pixels, an anode pixel 62d with inner square shaped and outer square border shaped sub-pixels, an anode pixel 62e with half-circle shaped sub-pixels, an anode pixel 62f with inter-digitated (finger shaped) sub-pixels and an anode pixel 62h with a divided circle shaped sub-pixel. Additionally, in some embodiments, wherein a shared charge is provided, the anode pixels 62h are square in shape without sub-pixels. It should be noted that with respect to the anode pixels 62a-62g, the anode pixel 62f is used in various embodiments, unless the pixel size is less than 0.1 mm (as be discussed in more detail below), which includes patterning the electrodes with features less than the 0.1 mm.

All row electrodes in each row are connected to a row line (one is shown in FIG. 5). All column electrodes in each row are connected to a column line (one is shown in FIG. 5). Each column line and each row line are connected to an electronic channel. In the depicted embodiment of FIG. 5, a 16×16 pixels detector needs only 16+16=32 channels. Location is determined as the intersection of the row and column channels in which an event was detected. The noise is given by (assuming charge is shared by two electrodes of the same pixel) as follows: dark current through 40*40/32=50 mm$^2$ of crystal, statistical fluctuation of the electron-hole generation and twice the electronic noise of a single channel.

The same configuration may be extended to smaller pixel sizes, for example 0.5×0.5 mm pixels. In this case, there are 80 rows and 80 columns and 160 channels used. About 40 percent of the events would fall on two adjacent pixels, so in this embodiment, four channels (two adjacent rows and column) are summed to yield the total charge. The noise is given by (four channels) as follows: dark current through 4*40*40/160=40 mm$^2$ of crystal, statistical fluctuation of the electron-hole generation and four times the electronic noise of a single channel. Noise is given by (two channels) as follows: dark current through 2*40*40/160=20 mm$^2$ of crystal, statistical fluctuation of the electron-hole generation and twice the electronic noise of a single channel.

Figure 6:
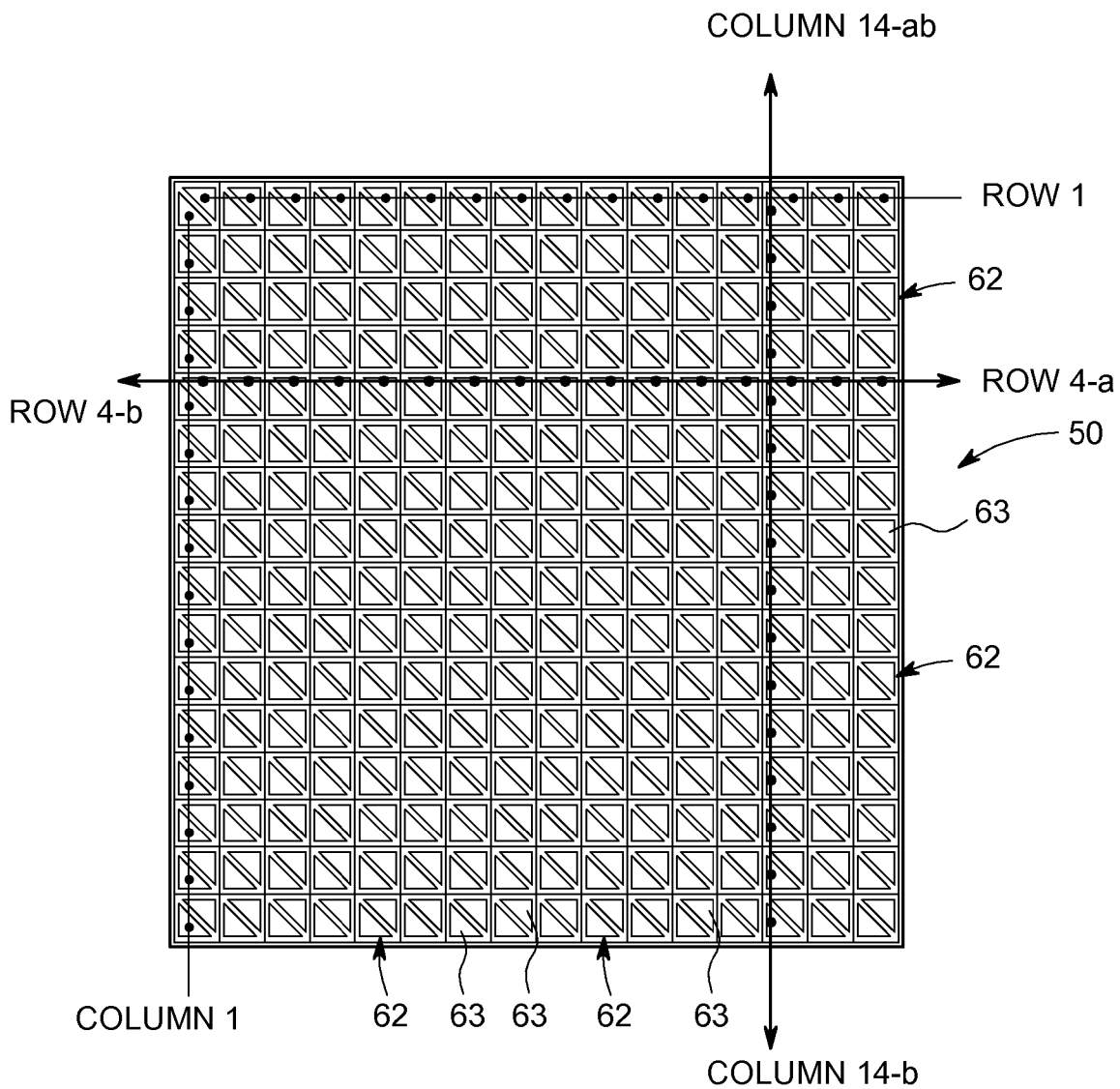
FIG. 6 is a top plan view of pixelated detector formed in accordance with various embodiments and illustrating a row and column connection arrangement.

Thus, a configuration may be provided that uses smaller pixels, or that increases the number of channels by connecting each channel to only part of the pixels in a row (column). For example, the number of channels may be doubled by connecting the electrodes as shown in FIG. 6. If pixel size is reduced to about 0.1 mm (400+400=800 channels), pixel anodes 62a, 62c, 62e, 62f and 62g may also be used.

Figure 9:
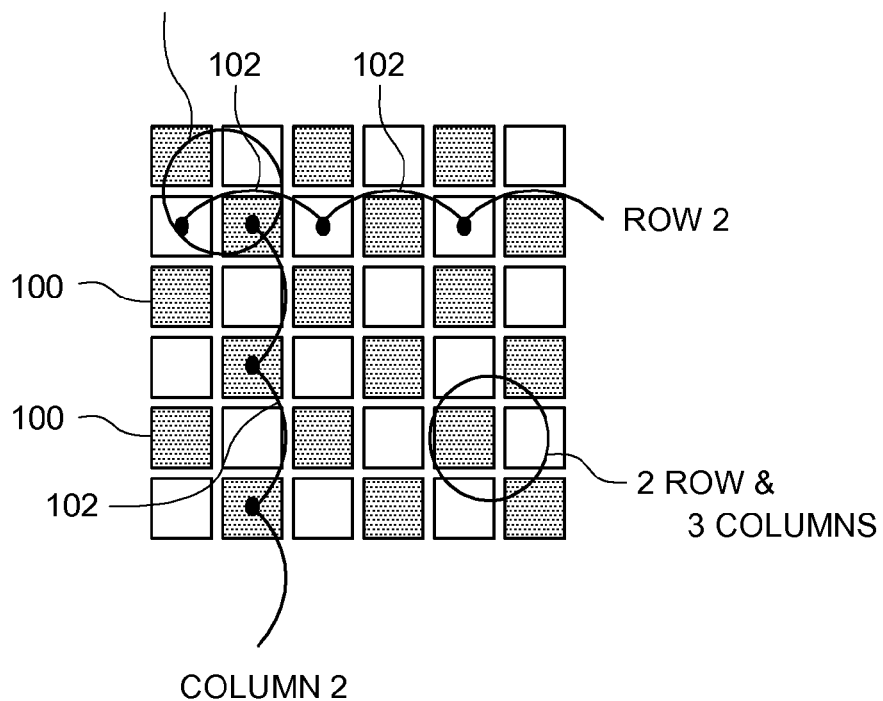
FIG. 9 is a diagram illustrating a pixel connection arrangement formed in accordance with various embodiments.

For a pixel size of less than 0.1×0.1 mm, at least four pixels are activated in two or three rows and two or three columns as illustrated in FIG. 9. It should be noted that a circular electron cloud of 0.1 mm diameter is assumed. Because at least two rows and two columns are activated, sub-pixel resolution may be provided by calculating the following:

$$X=(x1*sx1+x2*s2x+\ldots)/(sx1+sx2+sx2\ldots),$$

wherein x1 (2, 3, . . . ) is the x location of the first (second, . . . ) column; and sx1, (2, 3, . . . ) is the signal measured in the first (second, . . . ) column ("0" for channels that were not activated).

The same calculation is also performed for the Y position from row signals. It should be noted that different algorithms may be used, for example, similar to the Anger algorithm used in PMT based detectors and the row columns algorithm used to provide Correlated Signal Enhancement (CSE) as described in more detail herein. It also should be noted that the number of channels increases with this method (2*40/0.1=800) with the number increased as pixel size is reduced. The number of channels increases as the square of the resolution improvement. As each channel generates heat, active cooling may be provided.

Figure 11:
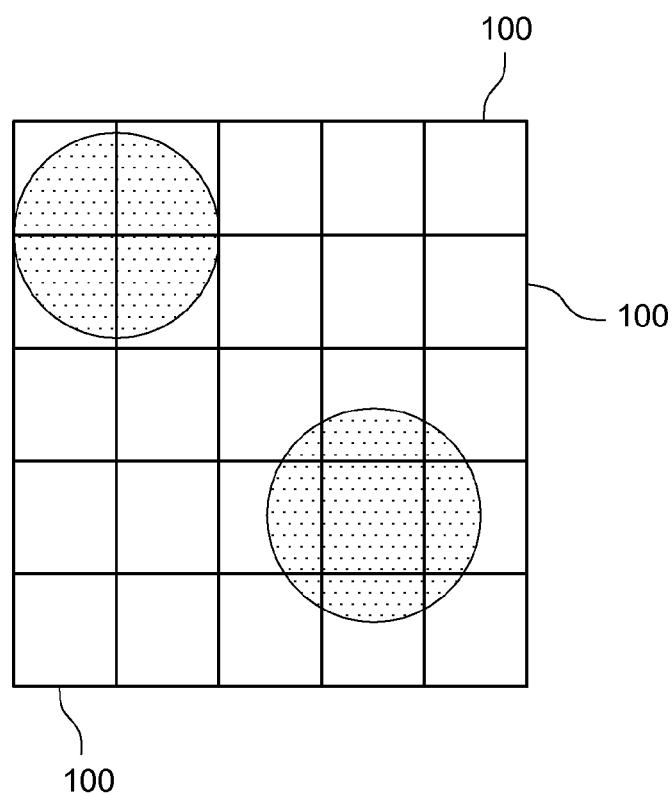
FIG. 11 is a diagram illustrating charge detection in accordance with various embodiments.

The number of channels may be reduced by different connection arrangements among the pixels. For example, with reference to FIGS. 9 and 11 showing the connection of anode pixels 100, and as can be seen therein, each event (e.g., charge interaction) creates signal on at least four adjacent electrodes. Thus, an event location may be uniquely defined if a unique combination of four channels is activated. The number of unique combinations of n items out of N is given by $N!/(n!)^2$. For a pixel size of 0.1 mm, the total number of locations is $(40/0.1)^2=160,000$. In comparison, the number of unique groups of four channels out of 256 is 210,165,935. It should be noted that as few as 43 channels may be enough as such channels allow over 160,000 combinations.

Figure 12:
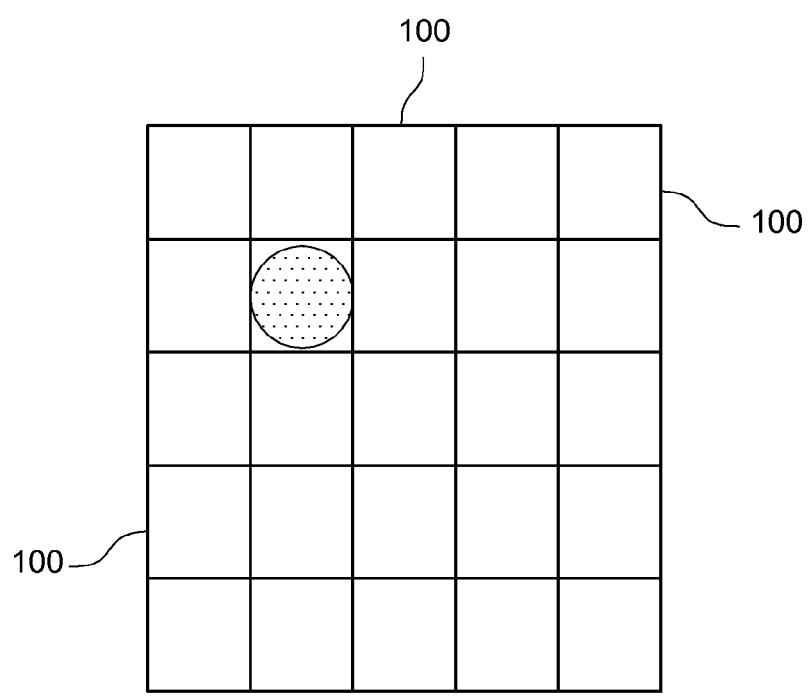
FIG. 12 is a diagram illustrating charge detection having no combination of channels.
Figure 13:
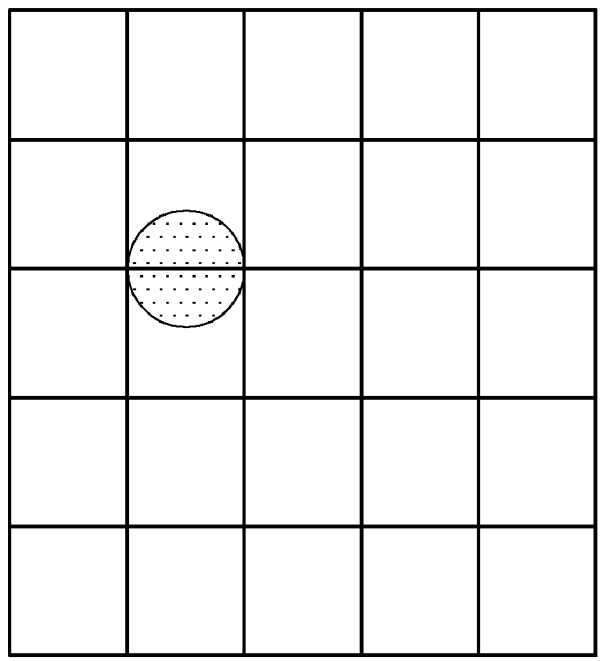
FIG. 13 is a diagram illustrating charge detection without interpolation of location in the y-axis.
Figure 14:
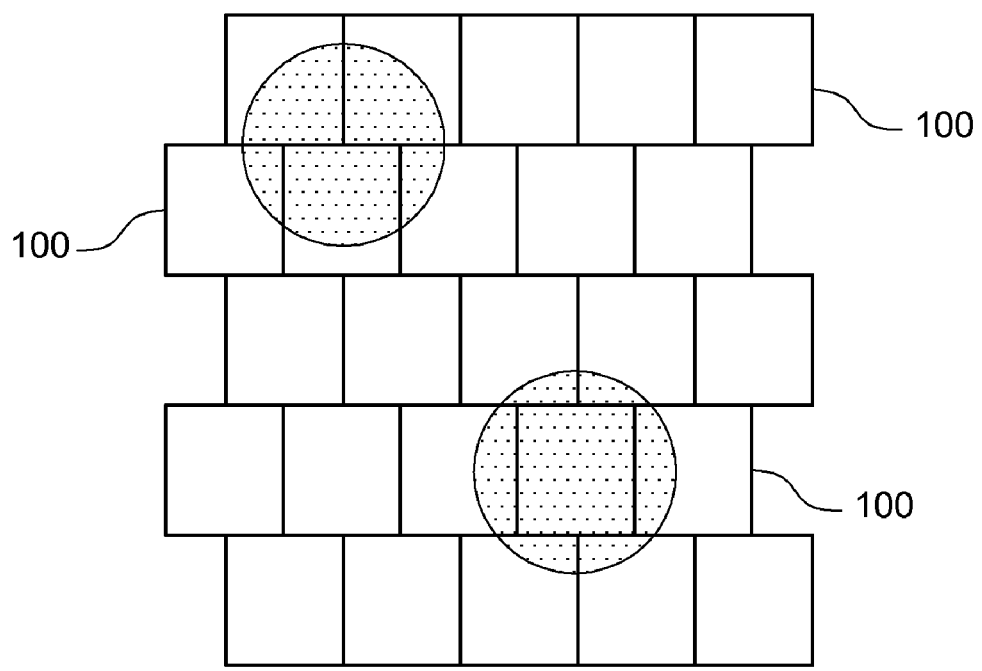
FIG. 14 is a diagram illustrating charge detection using staggered anodes in accordance with various embodiments.
Figure 15:
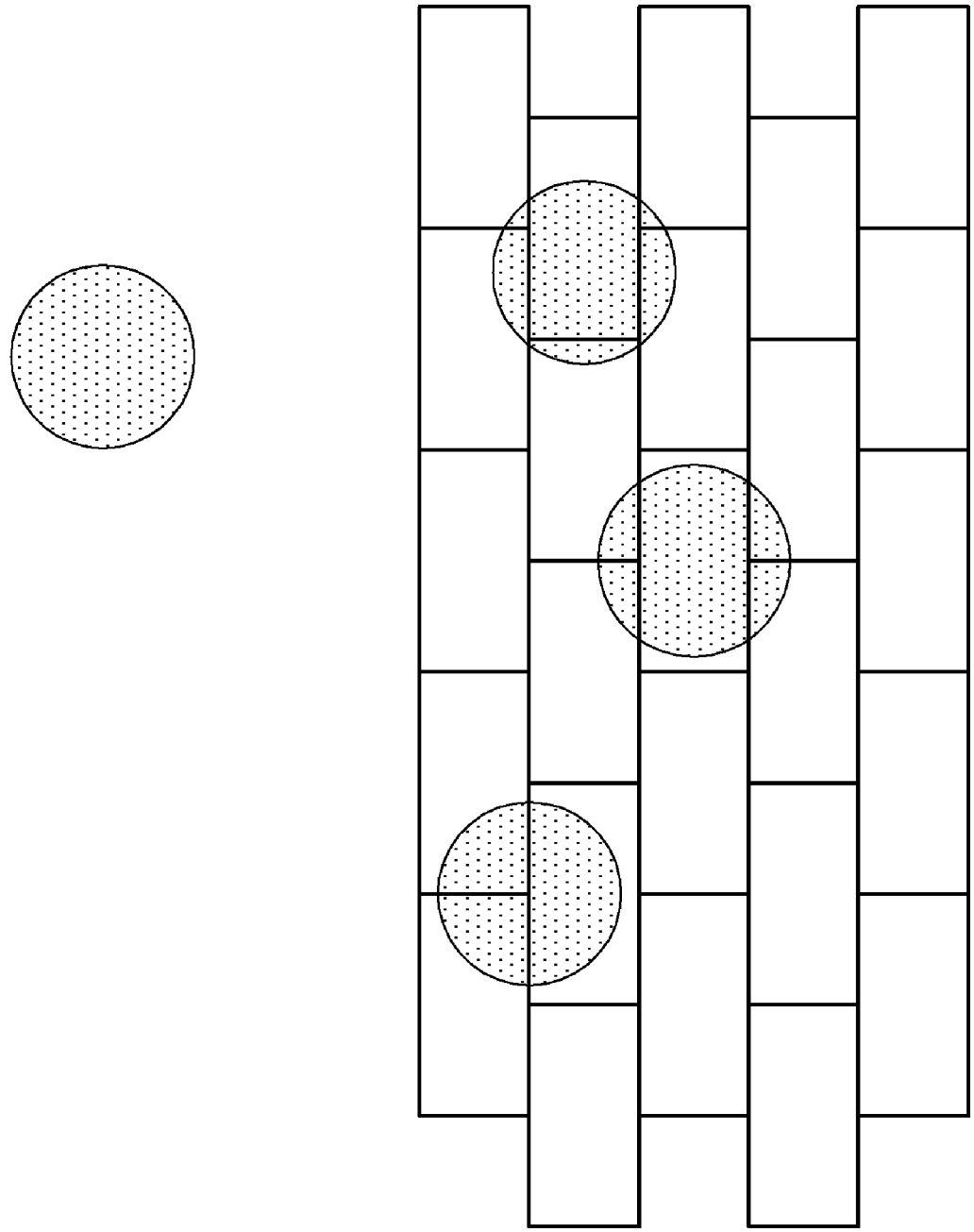
FIG. 15 is a diagram illustrating charge detection using staggered and stretched anodes in accordance with various embodiments.

As can be seen in FIG. 11, up to nine channels may be needed to completely collect all the charge. However, too large anodes in comparison to the electronic charge may cause the charge to be collected on one anode only as illustrated in FIG. 12. In this case, a combination of channels to determine the location cannot be used. If the charge is collected on one anode (pixel 100) in a specific direction (as in FIG. 13), the location along the axis cannot be interpolated. However, by staggering the anodes as in FIG. 14, the minimal number of channels that are activated by an event is 5 to 7, which reduces the noise. Staggering the anodes allows "stretching" the configuration (as shown in FIG. 15) and using rectangular anodes (instead of square) or other shaped anodes, having an aspect ratio of up to 1:2, thus further reducing the number of channels (by a factor of up to 2).

Figure 7:
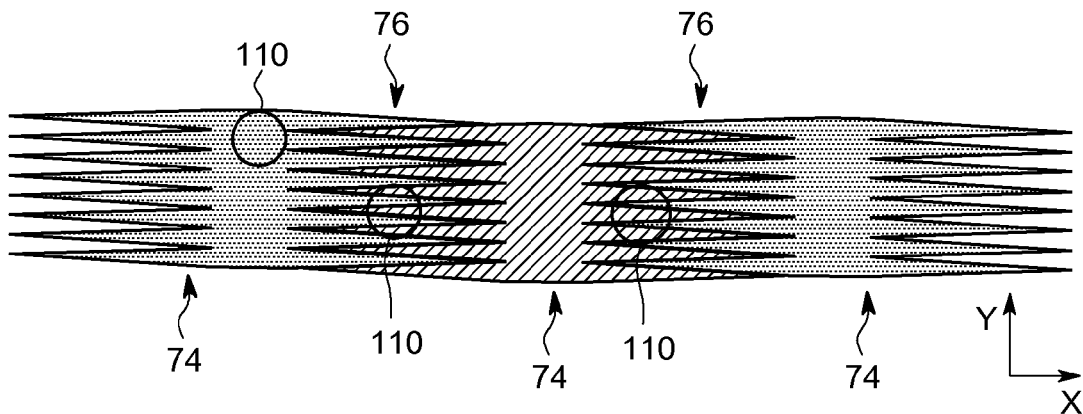
FIG. 7 is a top plan view of a pixelated detector having stretched pixels formed in accordance with various embodiments.

It should be noted that the charge distribution among the several electrodes is non linear with position and may result in error, which reduces the effectiveness and accuracy of "sub-pixel interpolation" and complex linearity correction is provided. The linearity issue may be solved by providing smaller pixels, but would result in having to sum many channels and, thus increases the contribution of the electronic noise. Alternatively, interlaced electrode configurations such as shown in FIG. 7 (and as described in more detail herein) may be used to increase linearity, while allowing increase in anode size.

Figure 16:
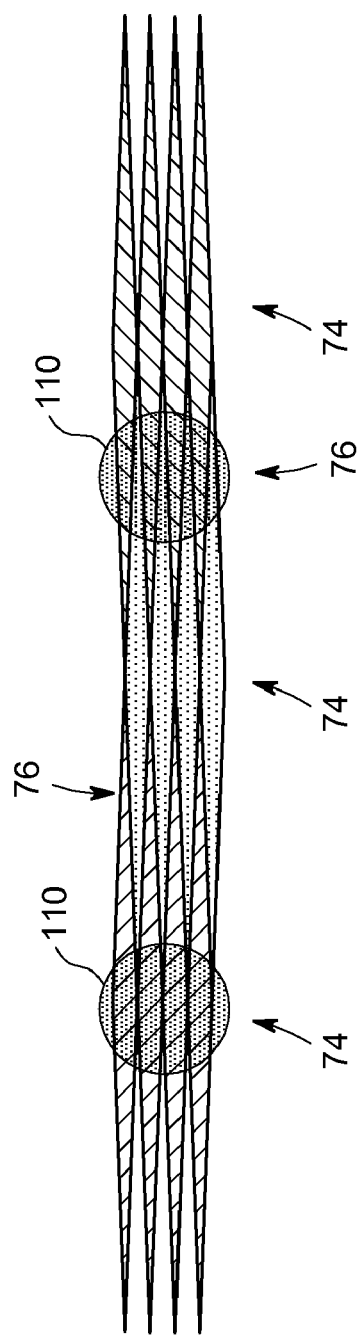
FIG. 16 is a top plan view of a pixelated detector having stretched pixels formed in accordance with various embodiments.

Further stretching of the anodes may be provided, without losing the ability to interpolate along the stretched axis (and increasing the interpolation linearity along that axis) by using an interlaced diode configuration of FIG. 16. Charge collected on interlaced anodes is approximately proportional to the overlap of the charge "footprint" on that anode. Because the charge is not uniformly spread, which causes deviation from linearity, may be corrected by linearity correction transformations as known in the art. In the axis along the stretching, location accuracy is determined by the signal to noise. Thus, a 1:10 stretching may be provided while conserving the effective resolution.

Figure 17:
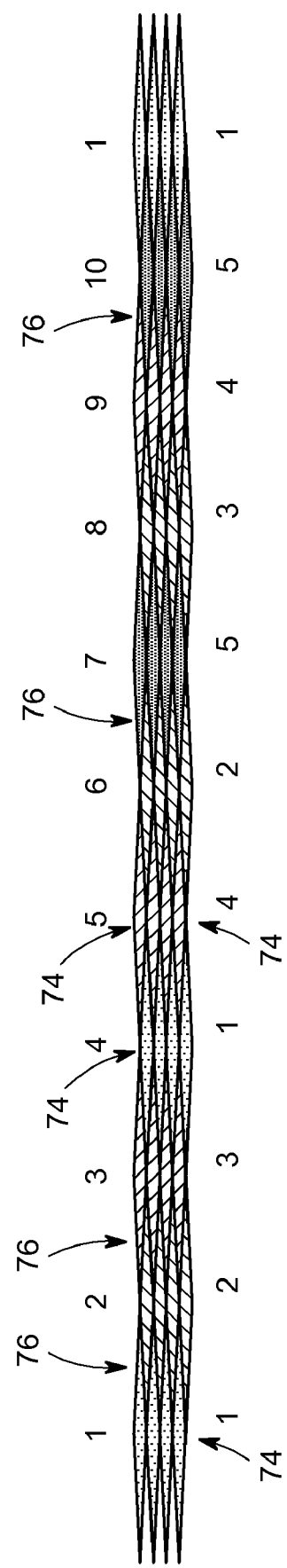
FIG. 17 is a top plan view of a pixelated detector having stretched pixels formed in accordance with various embodiments illustrating anode pixels connected in pairs.
Figure 18:
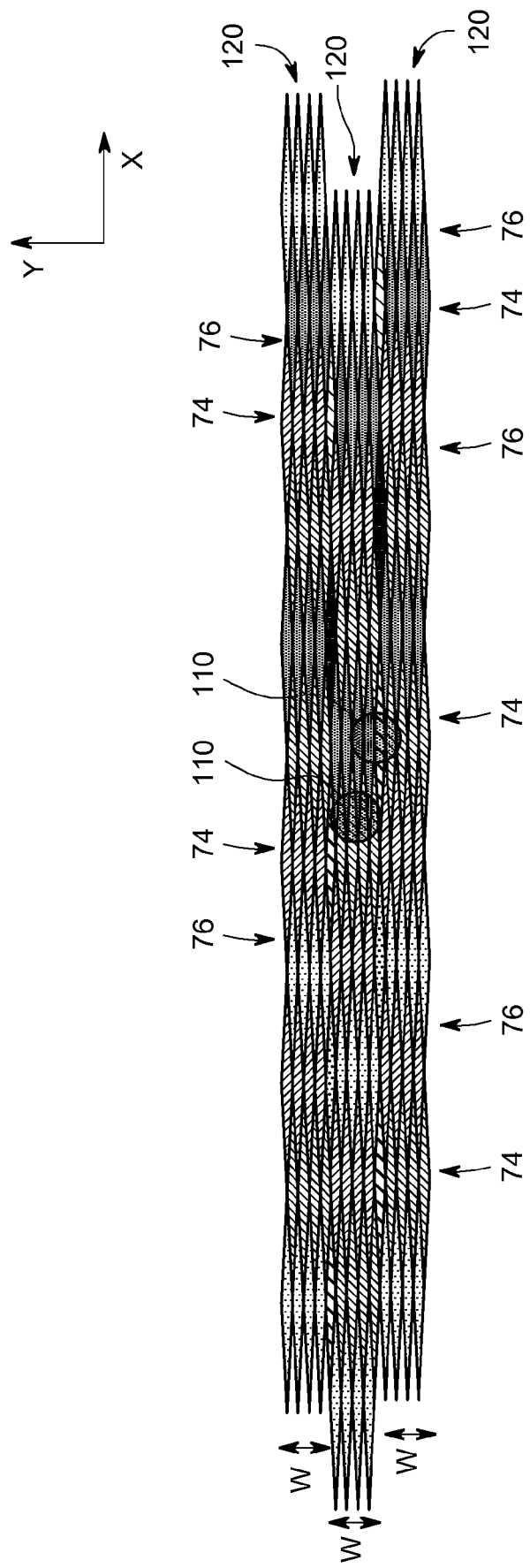
FIG. 18 is a top plan view of a pixelated detector having stretched pixels in a two-dimensional array formed in accordance with various embodiments.

FIG. 17 illustrates how a one dimensional (1D) array with five channels allows spanning a length of eleven pixels, each of which may be longer than the charge size (e.g., 3 to 10 times) with resolution that may be better than the charge footprint, using interlaced anodes and "two pixels combination" to determine the location. Additionally, FIG. 18 shows the combination of all these methods into one stretched axis, interlaced and staggered pixels with combinatoric and interpolative location determination.

Thus, referring again to FIGS. 4 through 6, the pixelated detector 50 may include a plurality of rows and columns of sub-pixelated elements formed from the anode pixels 62 and shaped sub-pixels 63. In the illustrated embodiment, the pixelated detector 50 includes sixteen rows and columns of anode pixels 62, which may be sized, for example, about 0.3 mm$^2$/pixel with a 4 mm thick crystal. Accordingly, 256 channels are used in connection with the pixelated detector 50. A steering grid 90 also may be provided around the anode pixels 62 to focus the charge sharing, namely the charge cloud between anode pixels 62 and/or shaped sub-pixels 63. The position information may then be determined from summing the outputs from the rows and columns, as described in more detail herein, or for example, as described in U.S. Pat. No. 5,504,334. It should be noted that the size of the shaped sub-pixels 63 in various embodiments is smaller than a charge cloud (e.g., a smallest expected electron cloud).

Additionally, the anode pixel 62 may be shaped and arranged differently. For example, as shown in FIG. 7, a plurality of stretched anode pixels 74 may be provided defining saw-toothed or zig-zaged overlapping regions 76 with adjacent anode pixels 74 (defining an interlaced electrode configuration). Accordingly, interlaced pixel edges are formed from adjacent anode pixels 74. In this embodiment, the anode pixels 62 are diced or cut such that the anode pixels 74 are stretched in one-dimension, for example, in the x-axis direction. Accordingly, the anode pixels 74 are lengthened or stretched in one direction such that the anode pixels 74 are longer along one axis than another axis. The anode pixels 74 may be cut or etched in the substrate using any suitable process. In some embodiments, the anode pixels 74 are formed by a cutting process using laser cutting to define the saw-toothed or zig-zaged pattern. The laser cutting may be performed using any suitable method, which may be provided for etching or dicing the substrate, such as any cutting method in the art for photolithography, etching or dicing a semiconductor material substrate may be used.

Using one or more of the pixelated detectors of the various embodiments, a pixel configuration is provided such that the charge distribution, for example, a charge cloud as described herein, induces a signal on a primary pixel, as well as one or more adjacent pixels (particularly if the charge interaction is off-center). The primary pixel is determined as the pixel with the highest signal, for example, the highest integrated charge. In accordance with various embodiments, the output information (as described in more detail above), including charge information, from the anode of the pixel with the highest charge and output information from the anodes of one or more adjacent or neighboring anodes (e.g., neighboring eight anodes), having a low signal strength, are used to determine the location of the initial photon interaction with the anodes. The location is determined as described in more detail herein.

It should be noted that optionally calibration maps, such as linearity maps, energy correction maps and sensitivity maps may be used to further correct for image distortions. Also, as described herein, depth information may be used for energy correction, for example, if the charge cloud appears on three or more pixels in a row or column.

Figure 8:
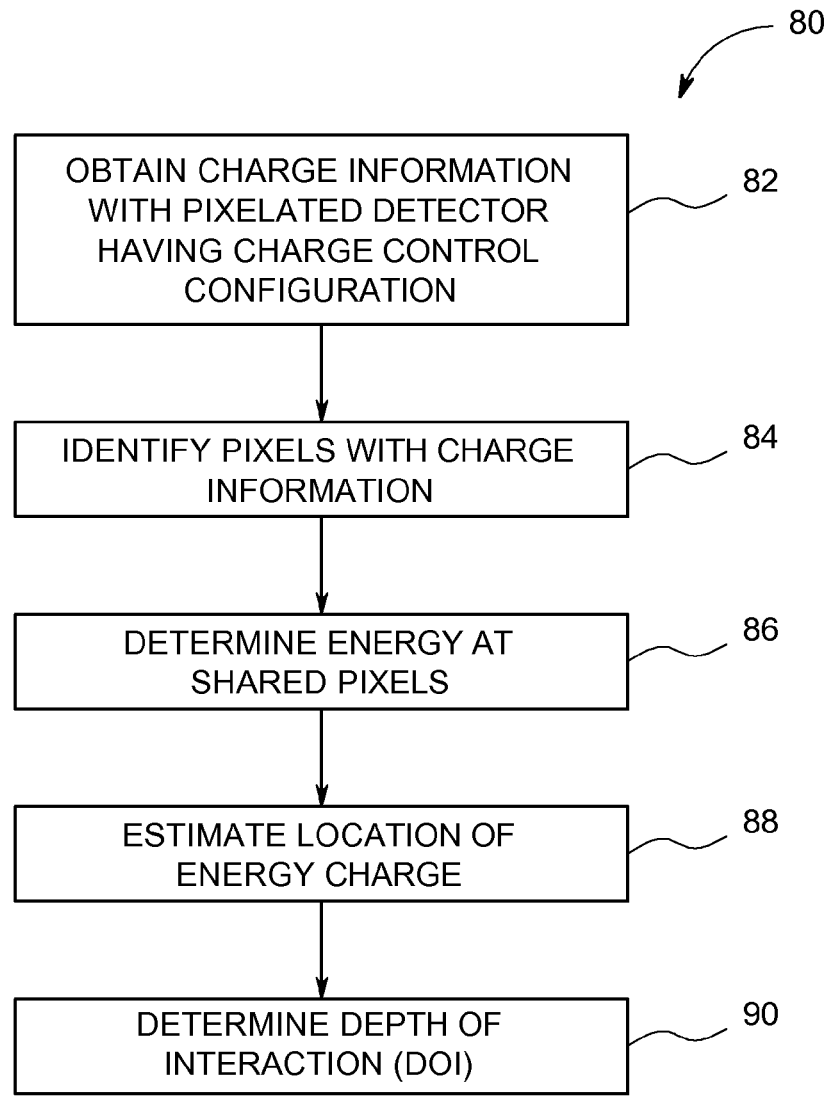
FIG. 8 is flowchart of a method to determine a location of a charge interaction with a pixelated detector in accordance with various embodiments.

Accordingly, in some embodiments, a method 80 (as shown in FIG. 8) may be implemented to determine a location of a charge interaction with a pixelated detector. In particular, at 82 charge information regarding a charge interaction with a pixelated detector is obtained using a pixelated detector having a charge control configuration as described herein. The charge control may be provided, for example, by shaping anode pixels or sub-pixels thereof.

It should be noted that according to various embodiments, dark currents, namely currents that are induced in the detector when photons are not be detected, are reduced. For example, the cathode may be formed by current-blocking (e.g., Schottky-type) contacts to limit detector dark current, and the detector may be heated to increase hole charge mobility. Additionally, a higher bias voltage may be used to collect more charge, more quickly. Additionally, the use of the steering grid 90 reduces the anode collection area, and thus also dark current.

Additionally, row and column summing may be used in accordance with various embodiments to obtain the charge information. For example, the pixels may be divided into row portions and a column portions corresponding to each portion of a sub-pixel being shaped and configured to provide charge sharing between the two sub-pixel portions as described in more detail herein. Each pixel portion may be bonded to a printed circuit board (PCB) in which rows and columns are connected with one readout connection for each row and column to a pre-amplifier, which may reside on the same or separate PCB. Each channel includes threshold detection and sample-and-hold circuitry. Accordingly, when an event is detected above a threshold on both a row and column channel, then the neighboring rows and columns are digitized for further event processing.

Figure 10:
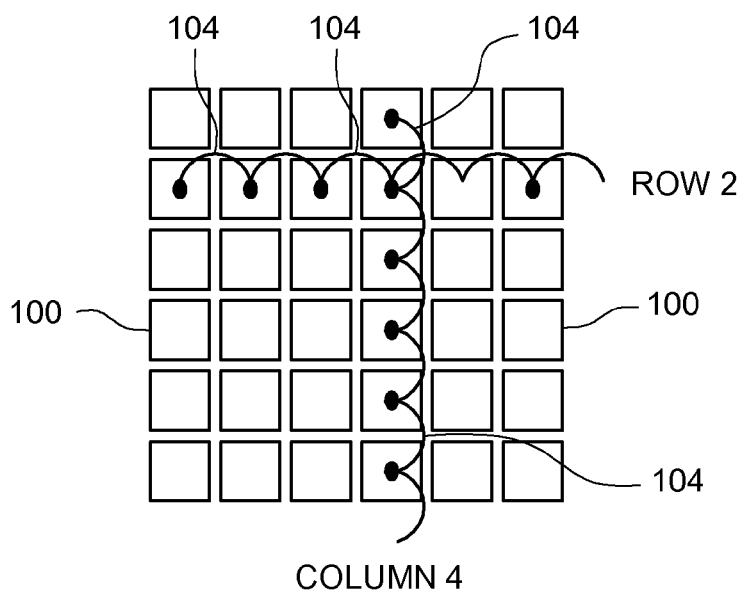
FIG. 10 is a diagram illustrating another pixel connection arrangement formed in accordance with various embodiments.

The summing may be accomplished using a connection arrangement as shown in FIGS. 9 and 10, which show a portion of a pixelated detector having a plurality of pixels, which are anode pixels 100. For example, as shown in FIG. 9, row and column summing may be provided when the anode pixels 100 are configured as described herein to provide charge cloud sharing. The illustrated checkerboard pattern is for illustration only and the anode pixels 100 are the same. Additionally, although only 6×6 pixels are illustrated, more pixels may be provided as part of the pixelated detector. For example, for a 4 cm×4 cm module with 0.5 mm anode pixel pitch, 80×80=6400 anode pixels and 160 channels (80 rows+80 columns) are provided.

In this embodiment, electrical connection 102 between pixels (illustrated by the dot) can be conductive or capacitive, and may include a preamplifier for each pixel anode 100 or only for the summed row or column. The connections 102 are provided between every other pixel anode 100 separately in each row and column. It should be noted that if each pixel anode 100 includes an analog to digital converter (ADC), then the line connecting a row or column of pixels is a data bus for digital rather than analog summation. It also should be noted that to readout the signals from the pixel anodes 100 to the preamplifiers in some embodiments (e.g., for 2n scaling), the capacitance of each line is significantly less than the preamplifier capacitance, with the capacitance decreasing with thicker CZT material.

The connection arrangement as shown in FIG. 10 may be used for row and column summing when the pixel anodes 100 are not necessarily configured to provide (e.g., ensure) charge cloud sharing, and may also may be used for smaller anode pixels. The electrical connection 104 between pixel anodes 100 (illustrated by the black dot) can be conductive or capacitive. The connections 104 are provided between each anode pixel 100 in each column and row, as well as therebetween. Additionally, a preamplifier is provided in connection with each pixel anode 100 to reduce or avoid cross talk between rows and columns. It should be noted that if each pixel anode 100 includes an ADC, then the line connecting a row or column of pixels is a data bus for digital rather than analog summation.

Referring again to the method 80 of FIG. 8, anode pixels sharing the charge are then identified at 84, for example using charge information for the readouts for one or more of the anode pixels. Thereafter, an energy at the shared pixels is determined at 86. For example, all digitized channels are summed to determine the energy of a detected gamma-ray or x-ray event. The location of the energy cloud is then determined, for example, estimated at 88. In particular, because of the intentional charge cloud sharing, a distribution of signal between multiple row channels and column channels for each event is present. The position, to sub-pixel accuracy, may be determined from a centroid or center of gravity (Anger-type) calculation as described in more detail herein. Additionally, the detector response to a scanned pencil-beam calibration may be stored and a maximum-likelihood position can then be determined during use. Alternatively, for single-pixel resolution, the peak row and column signals may be used.

Thereafter, a depth of interaction (DOI) may be determined at 90. For example, a time of flight difference between anode (electron) and cathode (hole) signals can be used to determine the DOI. The mobility of holes and electrons is different by more than an order of magnitude is some embodiments, which are accounted for in determining the DOI. Other DOI determinations according to various embodiments may use a difference in cathode and anode integrated charge (due to depth-dependent hole trapping) or cathode signal rise time.

Figure 20:
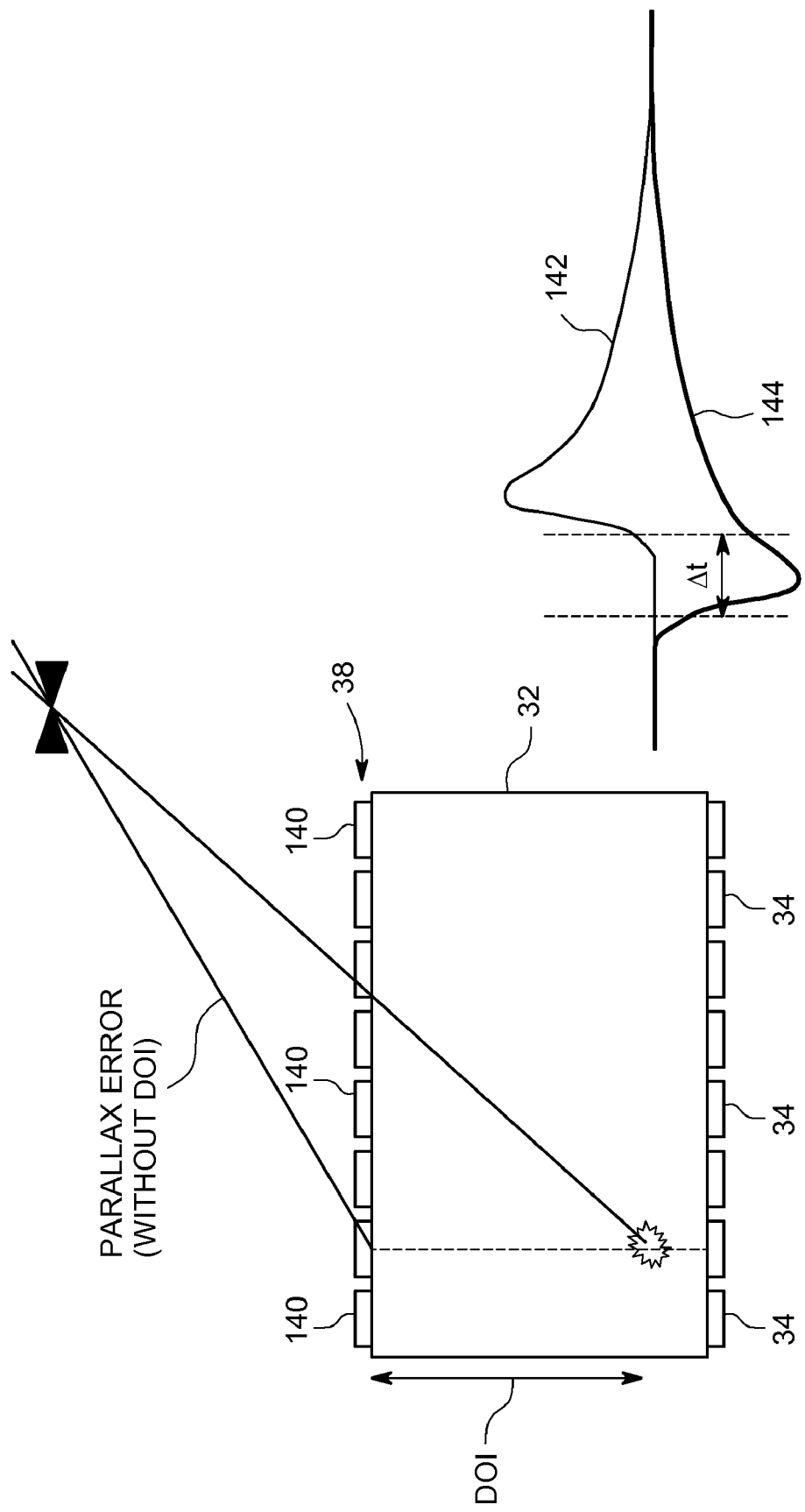
FIG. 20 is a diagram of a cross-sectional view of a portion of a pixelated detector formed in accordance with various embodiments having a pixelated anode and a pixelated cathode and illustrating a depth of interaction (DOI).

It should be noted that the cathode also may be pixelated (not necessarily at the same size as anode pixels) as shown in FIG. 20, which will provide redundant position information and reduce the paralyzability of the detector, and can provide higher count rates, such as for use in x-ray applications. Additionally, small pixelated cathodes will also be sensitive to holes only. As illustrated in FIG. 20, the cathode 38 is formed from a plurality of spaced apart cathode pixels 140 formed from a plurality of contacts. The illustrated embodiment measures events in three-dimensions (3D), namely adding the DOI information. Using this configuration, the DOI can be determined by measuring the time delay ($\Delta t$) between signals 142 and 144 or the ratio of integrals or rise time of summed cathode pixels 140. The DOI may be calibrated versus the time difference using, for example, a pencil beam entering the side of the detector. It should be noted that there is a different mobility $\mu$ of e– & h+ carriers. It also should be noted that blocking contacts and heat may be used to increase hole mobility.

Thus, using the various embodiments, and referring again for example to FIG. 7, charge clouds, illustrated as electron clouds 110 are detected by and impinge on one anode pixel 74 and at least one other anode pixel, for example, in the overlapping regions 76. It should be noted that the electron cloud 110 is illustrated as circular for simplicity in illustration. Accordingly, using the various embodiments, the amount of charge that reaches an anode is controlled, for example, by increasing the likelihood or ensuring that an electron cloud 110 impinges on at least two different anode pixels 74, which may be in the overlapping regions 76.

For example, as illustrated in FIG. 16, the anode pixels 74, which may form part of an Anger gamma camera, are configured such that each electron cloud 110 is detected by at least two anode pixels 74 and sometimes three or more anode pixels 74. As an example, the electron cloud 110 is 1 mm is size, and the anode pixel 74 is about 0.4 mm to 1.0 mm.

In other embodiments, for example, as shown in FIG. 17, output channels may be further reduced by arranging the anode pixels 74 and connecting the anode pixels 74 in pairs as illustrated by the numbers above the anode pixels 74. As illustrated, five channels define ten pairs of anode pixels 74, which may be arranged as detector triplets, namely in sets of three. Additional channels may define additional pairs, for example, seven channels define twenty one pairs of anode pixels 74.

The anode pixels 74 having overlapping regions 76 may also be implemented in a two-dimensional configuration as illustrated in FIG. 18. As shown, the anode pixels 74 are offset or staggered in every other row 120 of the array such that the overlapping regions 76 are at different locations in the x-axis direction for every other row 120. In this illustrated embodiment, the electron cloud 110 impinges on two or more anode pixels 74, which may be in the overlapping regions 76. Additionally, a minor charge effect may be experienced by neighboring anode pixels 74. In this embodiment, the width (W) of the rows 120 is sized about equal to the electron cloud 110 (e.g., an expected size of the electron cloud 110), while within the rows 120, the anode pixels 74 may be stretched multiple times the size of an electron cloud 110, for example, about four times larger or more.

Figure 19:
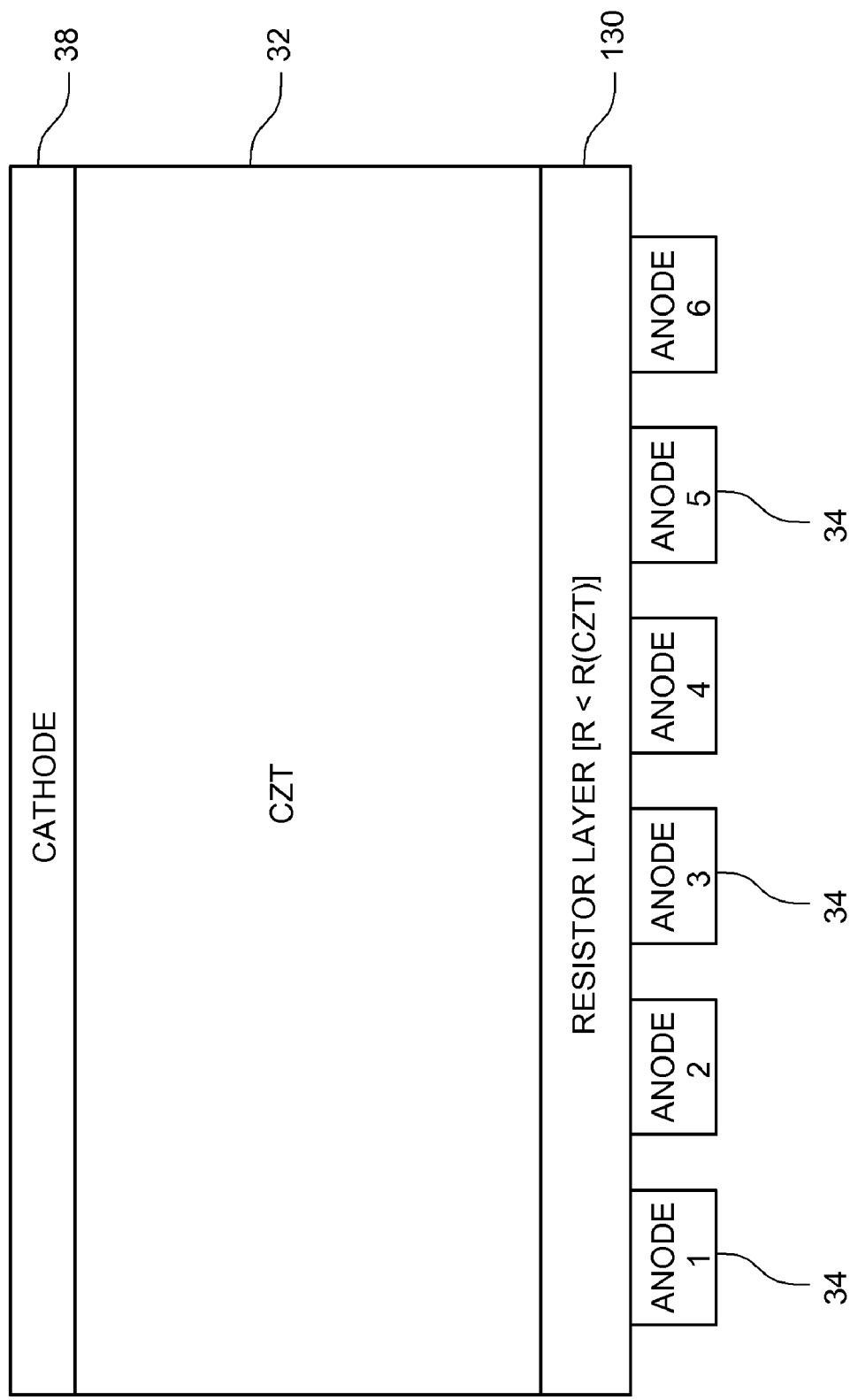
FIG. 19 is simplified cross-sectional view of a portion of a pixelated detector formed in accordance with various embodiments having a resistive layer.

Variations and modifications are contemplated. For example, as shown in FIG. 19, a resistive layer, illustrated as a resistive anode 130 is provided between the substrate 32 and the anodes 34, for example, formed on the substrate 32 by a depositing process in the art. In this embodiment, the charge is spread among the anodes 34 (namely the contacts) by the resistive anode 130, which is provided as a resistive layer. In a CZT application, the resistance of the resistive anode 130 is less than the resistance of the CZT material forming the substrate 32.

Figure 21:
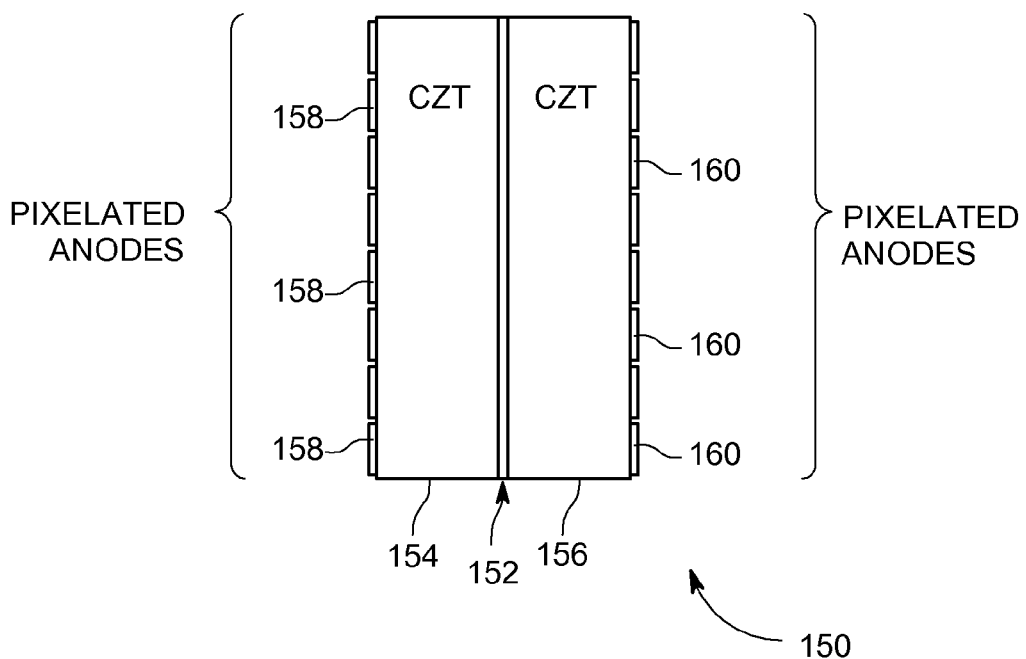
FIG. 21 is a diagram of a cross-sectional view of a portion of a two-layer pixelated detector formed in accordance with various embodiments.

As another example, and as shown in FIG. 21, a detector 150 may be provided, which is configured as a sandwiched detector having a common cathode 152 between two substrate layers 154 and 156, thereby forming a two-layer detector. In the illustrated embodiment, a plurality of pixelated anodes 158 are formed on the substrate layer 154 and a plurality of pixelated anodes 160 are formed on the substrate layer. 156.

Figure 22:
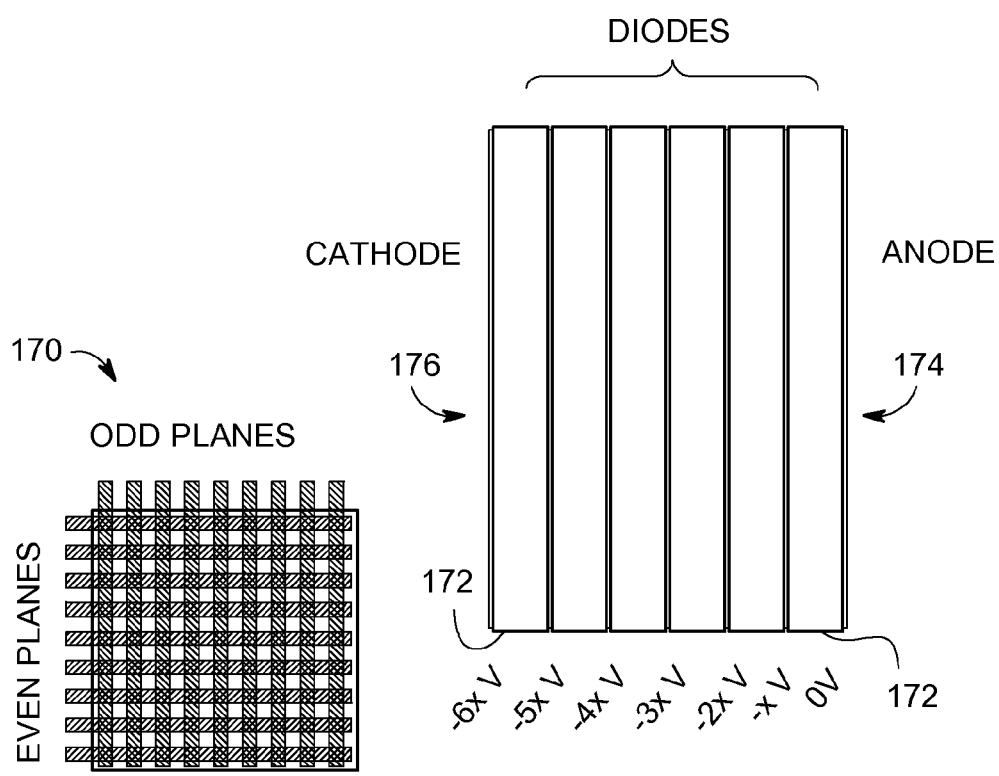
FIG. 22 is a diagram illustrating a multi-layer crossed strip detector formed in accordance with various embodiments.

As another example a multi-layer crossed strip detector 170 may be provided as shown in FIG. 22 having a plurality of substrate layers 172 defining diodes between an anode 174 and a cathode 176. The multi-layer crossed strip detector 170 may be divided into even and odd planes as shown.

Variations and modifications to the system having the pixelated detectors are also contemplated. For example in an x-ray transmission application, the power of the radiation source may be reduced to increase the size of the charge cloud. Accordingly, pixels having larger dimensions may be used.

Thus, various embodiments provide pixelated detectors such that a charge cloud is detected by at least two pixel anodes of the pixelated detectors. Accordingly, configurations of pixelated detectors are provided wherein there is a relationship between the location of the charge cloud and respective anode signals. In the various embodiments, the detector pixels may be shaped, sized, divided and/or positioned to allow at least two pixels to detect a charge cloud. Additional elements may be provided to facilitate the detection, such as a linear resistive plate.

Figure 23:
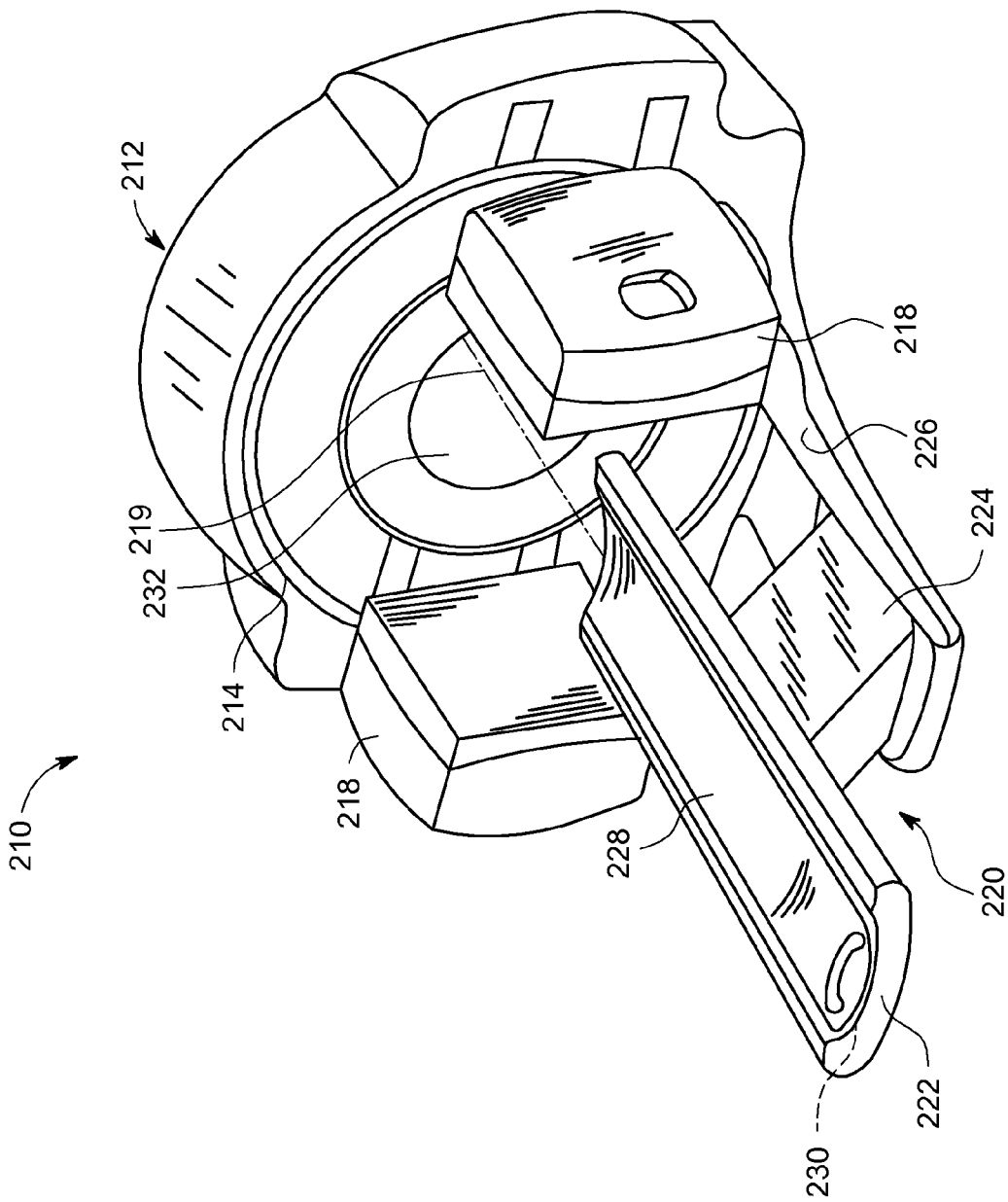
FIG. 23 is a perspective view of an exemplary nuclear medicine imaging system constructed in accordance with various embodiments.

The pixelated detectors of the various embodiments may be provided as part of different types of imaging systems, for example, NM imaging systems such as positron emission tomography (PET) imaging systems, SPECT imaging systems and/or x-ray imaging systems and CT imaging systems, among others. For example, FIG. 23 is a perspective view of an exemplary embodiment of a medical imaging system 210 constructed in accordance with various embodiments, which in this embodiment is a SPECT imaging system. The system 210 includes an integrated gantry 212 that further includes a rotor 214 oriented about a gantry central bore 232. The rotor 214 is configured to support one or more NM pixelated cameras 218 (two cameras 218 are shown), such as, but not limited to gamma cameras, SPECT detectors, multi-layer pixelated cameras (e.g., Compton camera) and/or PET detectors. It should be noted that when the medical imaging system 210 includes a CT camera or an x-ray camera, the medical imaging system 210 also includes an x-ray tube (not shown) for emitting x-ray radiation towards the detectors. In various embodiments, the cameras 218 are formed from pixelated detectors as described in more detail herein. The rotors 214 are further configured to rotate axially about an examination axis 219.

A patient table 220 may include a bed 222 slidingly coupled to a bed support system 224, which may be coupled directly to a floor or may be coupled to the gantry 212 through a base 226 coupled to the gantry 212. The bed 222 may include a stretcher 228 slidingly coupled to an upper surface 230 of the bed 222. The patient table 220 is configured to facilitate ingress and egress of a patient (not shown) into an examination position that is substantially aligned with examination axis 219. During an imaging scan, the patient table 220 may be controlled to move the bed 222 and/or stretcher 228 axially into and out of a bore 232. The operation and control of the imaging system 210 may be performed in any manner known in the art. It should be noted that the various embodiments may be implemented in connection with imaging systems that include rotating gantries or stationary gantries.

Figure 24:
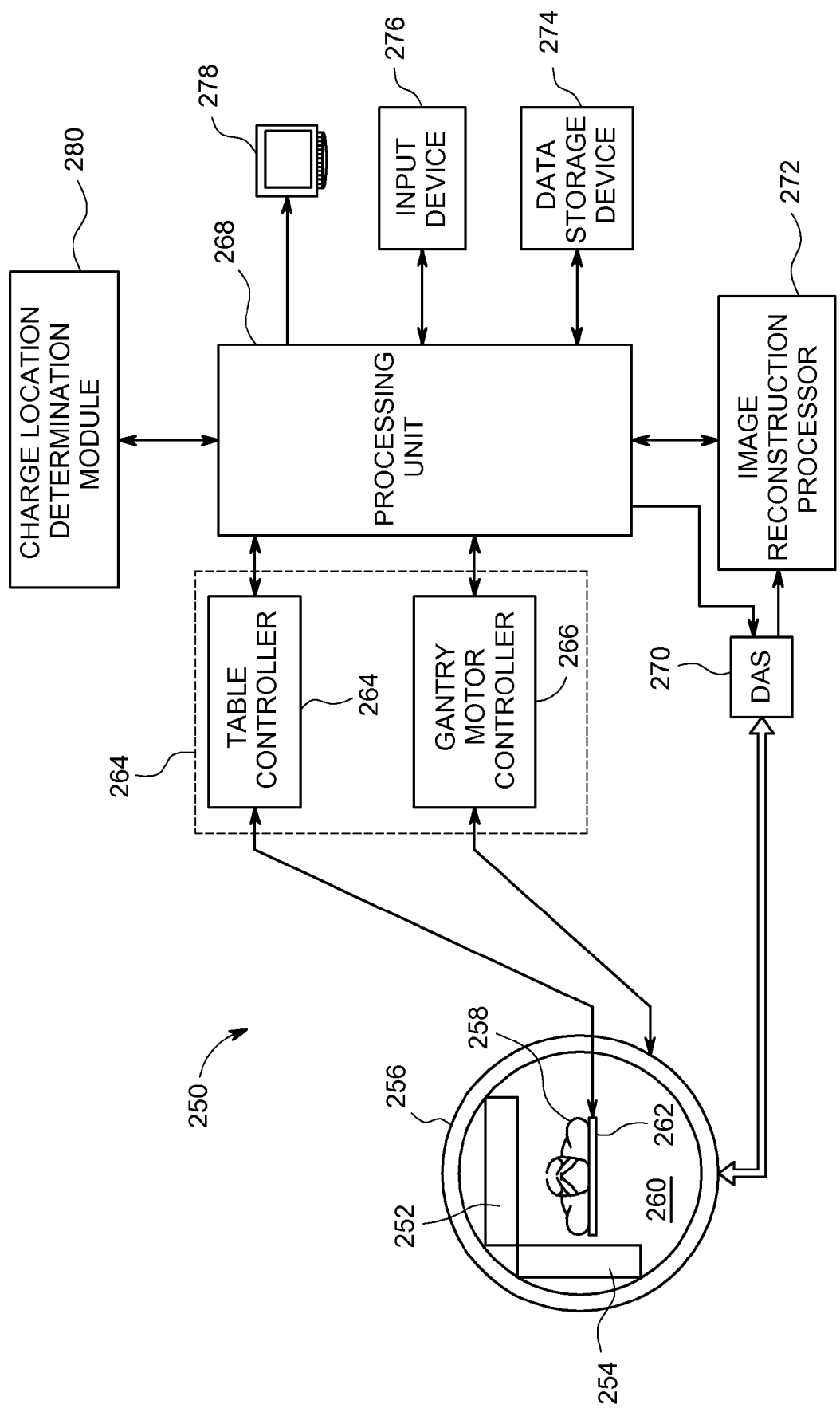
FIG. 24 is a block diagram of a nuclear medicine imaging system constructed in accordance with various embodiments.

FIG. 24 is a block diagram illustrating an imaging system 250 that has a plurality of pixelated imaging detectors configured in accordance with various embodiments mounted on a gantry. It should be noted that the imaging system may also be a multi-modality imaging system, such as an NM/CT imaging system. The imaging system 250, illustrated as a SPECT imaging system, generally includes a plurality of pixelated imaging detectors 252 and 254 (two are illustrated) mounted on a gantry 256. It should be noted that additional imaging detectors may be provided. The imaging detectors 252 and 254 are located at multiple positions (e.g., in an L-mode configuration) with respect to a patient 258 in a bore 260 of the gantry 256. The patient 258 is supported on a patient table 262 such that radiation or imaging data specific to a structure of interest (e.g., the heart) within the patient 258 may be acquired. It should be noted that although the imaging detectors 252 and 254 are configured for movable operation along (or about) the gantry 256, in some imaging systems, imaging detectors are fixedly coupled to the gantry 256 and in a stationary position, for example, in a PET imaging system (e.g., a ring of imaging detectors). It also should be noted that the imaging detectors 252 and 254 may be formed from different materials as described herein and provided in different configurations known in the art.

One or more collimators may be provided in front of the radiation detection face (not shown) of one or more of the imaging detectors 252 and 254. The imaging detectors 252 and 252 acquire a 2D image that may be defined by the x and y location of a pixel and the location of the imaging detectors 252 and 254. The radiation detection face (not shown) is directed towards, for example, the patient 258, which may be a human patient or animal. It should be noted that the gantry 256 may be configured in different shapes, for example, as a "C", "H" or "L".

A controller unit 264 may control the movement and positioning of the patient table 262 with respect to the imaging detectors 252 and 254 and the movement and positioning of the imaging detectors 252 and 254 with respect to the patient 258 to position the desired anatomy of the patient 258 within the fields of view (FOVs) of the imaging detectors 252 and 254, which may be performed prior to acquiring an image of the anatomy of interest. The controller unit 264 may have a table controller 264 and a gantry motor controller 266 that each may be automatically commanded by a processing unit 268, manually controlled by an operator, or a combination thereof. The table controller 264 may move the patient table 258 to position the patient 258 relative to the FOV of the imaging detectors 252 and 254. Additionally, or optionally, the imaging detectors 252 and 254 may be moved, positioned or oriented relative to the patient 258 or rotated about the patient 258 under the control of the gantry motor controller 266.

The imaging data may be combined and reconstructed into an image, which may comprise 2D images, a 3D volume or a 3D volume over time (4D).

A Data Acquisition System (DAS) 270 receives analog and/or digital electrical signal data produced by the imaging detectors 252 and 254 and decodes the data for subsequent processing as described in more detail herein. An image reconstruction processor 272 receives the data from the DAS 270 and reconstructs an image using any reconstruction process known in the art. A data storage device 274 may be provided to store data from the DAS 270 or reconstructed image data. An input device 276 also may be provided to receive user inputs and a display 278 may be provided to display reconstructed images.

Moreover, a charge location determination module 280 may be provided to determine a location of a charge or a charge cloud generated by photon (e.g., emission gamma photon or transmission x-ray photons) as described in more detail herein. The charge location determination module 280 may be implemented in software, hardware or a combination thereof.

The various embodiments and/or components, for example, the modules, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a floppy disk drive, optical disk drive, and the like. The storage device may also be other similar means for loading computer programs or other instructions into the computer or processor.

As used herein, the term "computer" or "module" may include any processor-based or microprocessor-based system including systems using microcontrollers, reduced instruction set computers (RISC), ASICs, logic circuits, and any other circuit or processor capable of executing the functions described herein. The above examples are exemplary only, and are thus not intended to limit in any way the definition and/or meaning of the term "computer".

The computer or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from their scope. While the dimensions and types of materials described herein are intended to define the parameters of the various embodiments, the embodiments are by no means limiting and are exemplary embodiments. Many other embodiments will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the various embodiments, including the best mode, and also to enable any person skilled in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. A method for controlling a charge distribution of a pixelated solid state photon detector, the method comprising:
   providing a plurality of pixels for a pixelated solid state photon detector in a configuration such that a charge distribution is detected by at least two pixels by at least one of shaping or spacing pixelated elements defining the pixels to share a charge for the at least two pixels;
   configuring each of the plurality of pixels in a stretched configuration having an overlapping region between adjacent pixels;
   obtaining charge sharing information from the at least two pixels; and
   determining a position of an interaction of the charge distribution with the plurality of pixels based on the obtained charge sharing information.

2. A method in accordance with claim 1 wherein the charge distribution is defined by a electron charge cloud and further comprising configuring the plurality of pixels to have a size smaller than the electron charge cloud.

3. A method in accordance with claim 1 wherein determining a position comprises using a centroid calculation to determine the position, wherein the centroid calculation uses charge information from a primary pixel and at least one adjacent pixel.

4. A method in accordance with claim 1 wherein the plurality of pixels are divided into rows and columns and further comprising using row and column summing to obtain the charge sharing information.

5. A method in accordance with claim 1 further comprising determining an energy of a detected photon by summing an energy output of a plurality of channels associated with the plurality of pixels.

6. A method in accordance with claim 1 wherein providing a plurality of pixels comprises providing a plurality of anode pixels and a plurality of cathode pixels.

7. A method in accordance with claim 1 further comprising determining a depth of interaction using a time based on a time of flight difference between anode and cathode signals of the pixelated solid state photon detector.

8. A method in accordance with claim 1 further comprising determining a correction factor for the plurality of pixels based on the determined position.

9. A method in accordance with claim 1 further comprising configuring each of the plurality of pixels into sub-pixels.

10. A method in accordance with claim 1 further comprising interconnecting the plurality of pixels such that alternating pixels in each of a plurality of rows and columns of a pixel array are connected.

11. A method in accordance with claim 1 wherein the overlapping regions comprise a saw-toothed configuration.

12. A method in accordance with claim 1 further comprising positioning the plurality of pixels such that the charge distribution is detected by the at least two pixels.

13. A method for controlling a charge distribution of a pixelated solid state photon detector, the method comprising:
   providing a plurality of pixels for a pixelated solid state photon detector in a configuration such that a charge distribution is detected by at least two pixels by at least one of shaping or spacing pixelated elements defining the pixels to share a charge for the at least two pixels;
   providing a resistive layer adjacent the plurality of pixels;
   obtaining charge sharing information from the at least two pixels; and
   determining a position of an interaction of the charge distribution with the plurality of pixels based on the obtained charge sharing information.

14. A method in accordance with claim 1 further comprising providing a steering grid configured to focus a charge sharing of the charge distribution.

15. A method in accordance with claim 1 further comprising providing a two-layer pixelated solid state photon detector having a plurality of pixelated anodes.

* * * * *